(12) United States Patent
Ogihara

(10) Patent No.: US 11,196,089 B2
(45) Date of Patent: *Dec. 7, 2021

(54) ELECTRICITY STORAGE DEVICE

(71) Applicant: KABUSHIKI KAISHA TOYOTA CHUO KENKYUSHO, Nagakute (JP)

(72) Inventor: Nobuhiro Ogihara, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,488

(22) Filed: Mar. 11, 2019

(65) Prior Publication Data
US 2019/0305378 A1    Oct. 3, 2019

(30) Foreign Application Priority Data

Apr. 3, 2018   (JP) .............................. JP2018-071365

(51) Int. Cl.
*H01M 10/00*    (2006.01)
*H01M 10/0585*    (2010.01)
(Continued)

(52) U.S. Cl.
CPC ........ *H01M 10/0585* (2013.01); *H01G 11/32* (2013.01); *H01G 11/56* (2013.01);
(Continued)

(58) Field of Classification Search
None
See application file for complete search history.

(56) References Cited

U.S. PATENT DOCUMENTS

2011/0039160 A1* 2/2011 Takahata ................. H01M 2/34
429/231.1
2013/0280604 A1* 10/2013 Ogihara ................ H01M 4/381
429/211
(Continued)

FOREIGN PATENT DOCUMENTS

JP    2008308421 A  * 12/2008
JP    2017-168339 A    9/2017

OTHER PUBLICATIONS

Machine translation of JP2008308421A (Year: 2008).*
(Continued)

*Primary Examiner* — Milton I Cano
*Assistant Examiner* — Mary G Henshaw
(74) *Attorney, Agent, or Firm* — Oliff PLC

(57) ABSTRACT

An electricity storage device includes a positive electrode containing a positive electrode active material, a negative electrode containing a negative electrode active material, and an electrolyte that includes an organic crystal layer including a layered structure and an organic solvent introduced into the organic crystal layer and that is interposed between the positive electrode and the negative electrode to conduct alkali metal ions. The layered structure includes an organic backbone layer containing an aromatic dicarboxylic acid anion having an aromatic ring structure, and an alkali metal element layer containing an alkali metal element that is coordinated with oxygen contained in a carboxylic acid of the organic backbone layer to form a framework. At least one of the positive electrode and the negative electrode adsorbs and desorbs the ions to store and release electric charge.

15 Claims, 16 Drawing Sheets

(51) Int. Cl.

| | |
|---|---|
| *H01M 10/0564* | (2010.01) |
| *H01M 4/587* | (2010.01) |
| *H01M 4/66* | (2006.01) |
| *H01G 11/32* | (2013.01) |
| *H01G 11/68* | (2013.01) |
| *H01G 11/56* | (2013.01) |
| *H01M 10/052* | (2010.01) |
| *H01M 4/60* | (2006.01) |
| *H01M 4/36* | (2006.01) |
| *H01M 4/38* | (2006.01) |
| *H01M 10/054* | (2010.01) |
| *H01M 4/04* | (2006.01) |
| *H01M 4/02* | (2006.01) |

(52) U.S. Cl.
CPC .......... *H01G 11/68* (2013.01); *H01M 4/0404* (2013.01); *H01M 4/366* (2013.01); *H01M 4/381* (2013.01); *H01M 4/587* (2013.01); *H01M 4/606* (2013.01); *H01M 4/661* (2013.01); *H01M 10/052* (2013.01); *H01M 10/054* (2013.01); *H01M 10/0564* (2013.01); *H01M 2004/029* (2013.01); *H01M 2300/0025* (2013.01); *H01M 2300/0065* (2013.01); *H01M 2300/0094* (2013.01)

(56) References Cited

U.S. PATENT DOCUMENTS

| | | |
|---|---|---|
| 2017/0271708 A1 | 9/2017 | Yoshima et al. |
| 2018/0277882 A1* | 9/2018 | Sugizaki ............ H01M 10/052 |

OTHER PUBLICATIONS

Taberna, P. L. et al., "Electrochemical Characteristics and Impedance Spectroscopy Studies of Carbon-Carbon Supercapacitors", Journal of The Electrochemical Society, vol. 150, Issue (3), pp. A292-A300, (2003).

Jul. 14, 2020 Office Action issued in Japanese Patent Application No. 2018-071365.

* cited by examiner

ELECTRICITY STORAGE DEVICE

BACKGROUND OF THE INVENTION

1. Field of the Invention

The present specification discloses an electricity storage device.

2. Description of the Related Art

Conventionally known electricity storage devices include electric double-layer capacitors. Electric double-layer capacitors can be measured for electric double-layer capacitance by evaluating their frequency performance using AC impedance measurement (see, for example, NPL 1). According to the evaluation of frequency performance, if a real component C' of a capacitance component increases on the lower frequency side, the formation of an electric double layer can be confirmed, and if an imaginary component C" is maximized on the lower frequency side, the responsivity of the electric double layer can be quantitatively evaluated.

CITATION LIST

Patent Literature

NPL 1: Journal of The Electrochemical Society 150, A292-A300 (2003)

SUMMARY OF THE INVENTION

In the meantime, a non-aqueous electrolytic solution containing a non-aqueous solvent and a supporting electrolyte dissolved therein is used as an electrolyte for an electricity storage device. However, if such a non-aqueous electrolytic solution forms an electric double layer, its frequency characteristics are in the range of $10^{-1}$ to $10^2$ Hz, and improvement in the responsivity of the electric double layer has not been taken into consideration. In addition, the responsivity of such a non-aqueous electrolytic solution to form an electric double layer depends greatly on temperature.

The present disclosure has been developed in view of these problems, and it is a primary object of the present disclosure to provide an electricity storage device including a novel electrolyte that forms a good electric double layer.

To achieve the above object, the inventors conducted intensive studies and found that introducing an organic solvent into a crystal layer including a layered structure of an aromatic dicarboxylic acid alkali metal salt enables conduction of alkali metal ions and, in addition, provides an electrolyte that forms a good electric double layer, thereby completing the invention disclosed in the present specification.

Thus, an electricity storage device disclosed in the present specification includes:

a positive electrode containing a positive electrode active material;

a negative electrode containing a negative electrode active material; and an electrolyte that includes an organic crystal layer including a layered structure and an organic solvent introduced into the organic crystal layer and that is interposed between the positive electrode and the negative electrode to conduct alkali metal ions. The layered structure includes an organic backbone layer containing an aromatic dicarboxylic acid anion having an aromatic ring structure, and an alkali metal element layer containing an alkali metal element that is coordinated with oxygen contained in a carboxylic acid of the organic backbone layer to form a framework.

At least one of the positive electrode and the negative electrode adsorbs and desorbs the ions to store and release electric charge.

Advantageous Effects of Invention

The present disclosure provides an electricity storage device including a novel electrolyte that forms a good electric double layer. Presumably, the electrolyte acts as an ion conductor because the coexistence of the layered structure of an aromatic dicarboxylic acid alkali metal salt and the organic solvent allows alkali metal ions in the alkali metal element layer of the layered structure to be conducted. The electrolyte, in which the solid layered structure serves as a supporting electrolyte, is able to exhibit ionic conductivity when no other supporting electrolytes are contained. The electrolyte forms good electric double layers at the interfaces with the electrodes, which can presumably enhance the charge/discharge response of the electricity storage device, for example, a capacitor.

DESCRIPTION OF THE PREFERRED EMBODIMENTS (Electrolyte)

Figure 1:
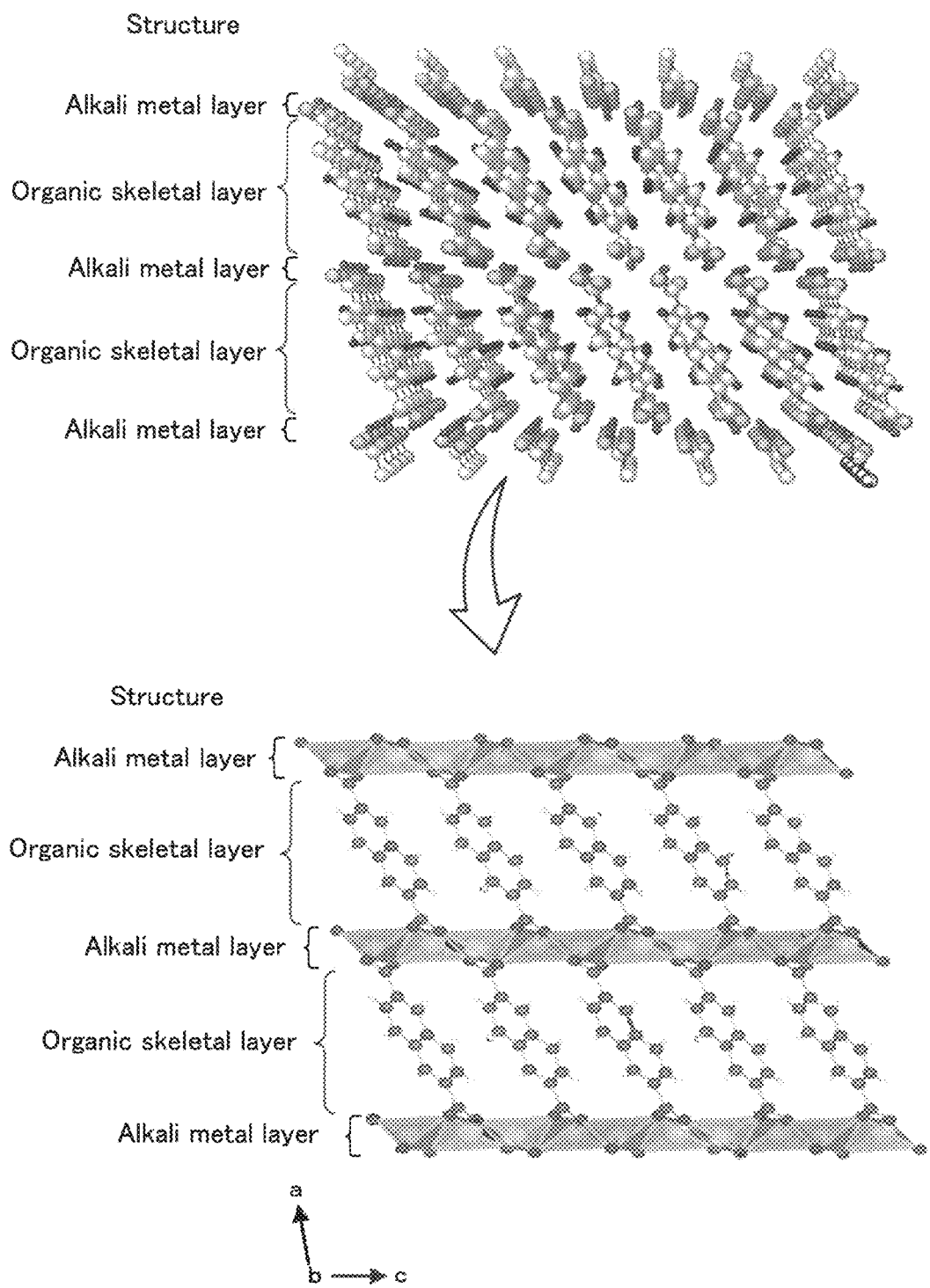
FIG. 1 illustrates an exemplary structure of a layered structure.

An electrolyte disclosed in the present specification conducts alkali metal ions and is used in an electricity storage device, the alkali metal ions serving as carriers in the electricity storage device. Examples of the alkali metal ions serving as carriers include Li ions, Na ions, and K ions, one or more of which may be used. In this specification, a description will be given mainly of Li for convenience. The electrolyte includes an organic crystal layer including a layered structure and an organic solvent introduced into the organic crystal layer. The organic crystal layer includes an organic backbone layer containing an aromatic dicarboxylic acid anion having an aromatic ring structure, and an alkali metal element layer containing an alkali metal element that is coordinated with oxygen contained in a carboxylic acid of the organic backbone layer to form a framework. The aromatic dicarboxylic acid anion has at least one aromatic ring and may have at least one of a non-fused polycyclic structure in which two or more aromatic rings are linked together and a fused polycyclic structure in which two or more aromatic rings are fused together. The one aromatic ring may be a benzene ring. The non-fused polycyclic structure may be, for example, a biphenyl structure. The fused polycyclic structure may be, for example, a naphthalene structure. FIG. 1 illustrates an exemplary structure of a layered structure. The example illustrated in FIG. 1 is a layered structure of dilithium naphthalenedicarboxylate in which naphthalene forms an organic backbone layer and lithium forms an alkali metal element layer.

The layered structure contained in the electrolyte may include an organic backbone layer including one aromatic ring structure or two or more aromatic ring structures linked together. For structural stability, the layered structure is preferably formed in layers by the interaction of π-electrons of an aromatic compound and preferably has a monoclinic crystal structure belonging to the space group $P2_1/c$. In the layered structure, the organic backbone layer may be, for example, a non-fused polycyclic compound including two or more linked aromatic rings, such as biphenyl, or a fused polycyclic compound including two or more fused aromatic rings, such as naphthalene, anthracene, or pyrene. The aromatic rings may be five-, six-, or eight-membered rings and are preferably six-membered rings. The number of aromatic rings is preferably 2 to 5. Two or more aromatic rings facilitate the formation of a layered structure, and five or less aromatic rings can provide a higher electricity density. The organic backbone layer may have a structure in which two or more carboxyl anions are bound to an aromatic ring. The organic backbone layer preferably includes an aromatic compound in which two carboxylic acid anions of a dicarboxylic acid anion are bound to diagonally opposite positions of an aromatic ring structure. The diagonally opposite positions to which the carboxylic acids are bound may be positions such that the position to which one carboxylic acid is bound and the position to which the other carboxylic acid is bound are farthest from each other, for example, the 2- and 6-positions, if the aromatic ring structure is naphthalene.

The layered structure may have a structure represented by at least one of formulae (1) to (3). In formulae (1) to (3), a is an integer of 1 to 5, and b is an integer of 0 to 3. These aromatic compounds may each have a substituent or a heteroatom in the structure thereof. Specifically, hydrogen in each aromatic compound may be substituted with halogen, linear or cyclic alkyl, aryl, alkenyl, alkoxy, aryloxy, sulfonyl, amino, cyano, carbonyl, acyl, amide, or hydroxyl, and carbon in each aromatic compound may be replaced with nitrogen, sulfur, or oxygen. More specifically, the layered structure may be an aromatic compound represented by formula (4) or (5). In formulae (1) to (5), A is an alkali metal. For structural stability, the layered structure preferably has a structure represented by formula (6) below in which four oxygen atoms of different dicarboxylic acid anions and an alkali metal element together form four coordination bonds. In formula (6), R has one or two or more aromatic ring structures. Among the plurality of Rs, two or more Rs may be the same, and one or more Rs may be different. A is an alkali metal. As described above, the layered structure preferably has a structure in which organic backbone layers are bonded together through an alkali metal element. Specific examples of such layered structures include alkali metal salts of 4,4'-biphenyldicarboxylic acid, alkali metal salts of 2,6-naphthalenedicarboxylic acid, and alkali metal salts of terephthalic acid, as represented by formulae (7) to (12), one or more of which may be used.

[Chem. 1]

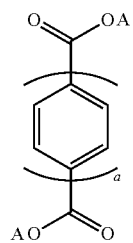

Formula (1)

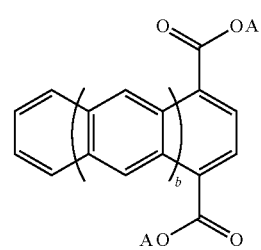

Formula (2)

-continued

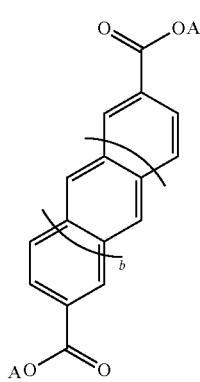

(a represents an integer of 1 to 5, b represent an integer of 0 to 3, and these aromatic compounds may have a substituent or a heteroatom in the molecular structure thereof. A represents an alkali metal.)

[Chem. 2]

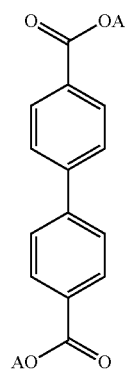

Formula (4)

(A represents an alkali metal)

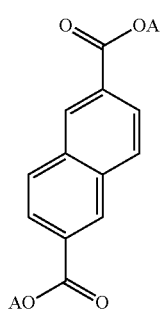

Formula (5)

[Chem. 3]

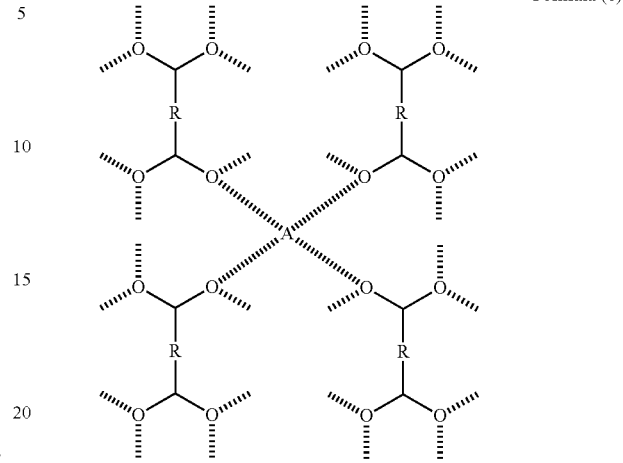

Formula (6)

R represents one or multiple aromatic ring structures, and two or more of the R's may be the same or one or more of the R's may be different from the others. A represents an alkali metal.

[Chem. 4]

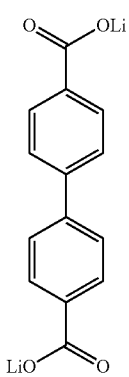

Formula (7)

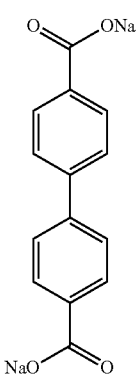

Formula (8)

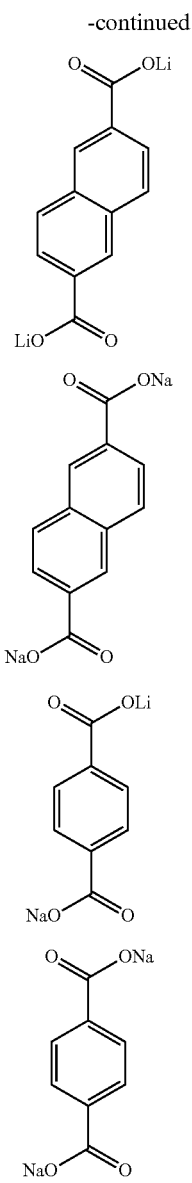

Formula (9)

Formula (10)

Formula (11)

Formula (12)

The alkali metal contained in the alkali metal element layer may be, for example, at least one of Li, Na, and K and is preferably Li. The alkali metal ions serving as carriers in the electricity storage device are preferably the same as the alkali metal element contained in the alkali metal element layer. The alkali metal element contained in the alkali metal element layer forms the framework of the layered structure and at the same time conducts the alkali metal ions. The alkali metal ions contained in the alkali metal element layer are presumably able to migrate while maintaining the structure because a predetermined organic solvent coexists.

The layered structure is solid and may be an organic crystal layer formed, for example, by molding. The organic crystal layer may be formed, for example, by press-molding a powder of the layered structure and optional additives such as a binder. That is, the organic crystal layer may be at least one of a self-supporting film and a self-supporting plate-like body. Alternatively, the organic crystal layer may be formed by application to an electrode mixture. That is, the organic crystal layer may be at least one of a film and a plate-like body that are supported by a substrate such as a current collector or an electrode mixture layer. The organic crystal layer preferably has a thickness of, for example, 1 μm or more and 5 μm or less. A thickness of 1 μm or more advantageously makes it easier to prevent, for example, short circuiting between electrodes. A thickness of 5 μm or less advantageously enables rapid conduction of alkali metal ions. The organic crystal layer is packed with the layered structure at a volume ratio of preferably 0.8 or more, more preferably 0.85 or more. The ratio of the layered structure correlates with the amount of alkali metal ion present and thus is preferably 0.8 or more. In view of, for example, the introduction of the organic solvent, the ratio is preferably 0.95 or less. In other words, the organic crystal layer preferably has a porosity of 20 vol % or less, more preferably 15 vol % or less, and preferably 5 vol % or more.

The organic solvent contained in the electrolyte may be any solvent such as a polar aprotic solvent. The organic solvent preferably has a dielectric constant of 10 or more, more preferably 20 or more. An organic solvent having a high dielectric constant is advantageous in that it more sufficiently ensures carrier conduction. More preferably, the organic solvent has a high boiling point, for example, 150° C. or higher. The organic solvent is preferably at least one of, for example, dimethyl sulfoxide, dimethylformamide, and propylene carbonate. The organic solvent need not necessarily contain a supporting electrolyte such as $LiPF_6$ or $LiBF_4$. This is because the layered structure acts as a supporting electrolyte.

Figure 2:
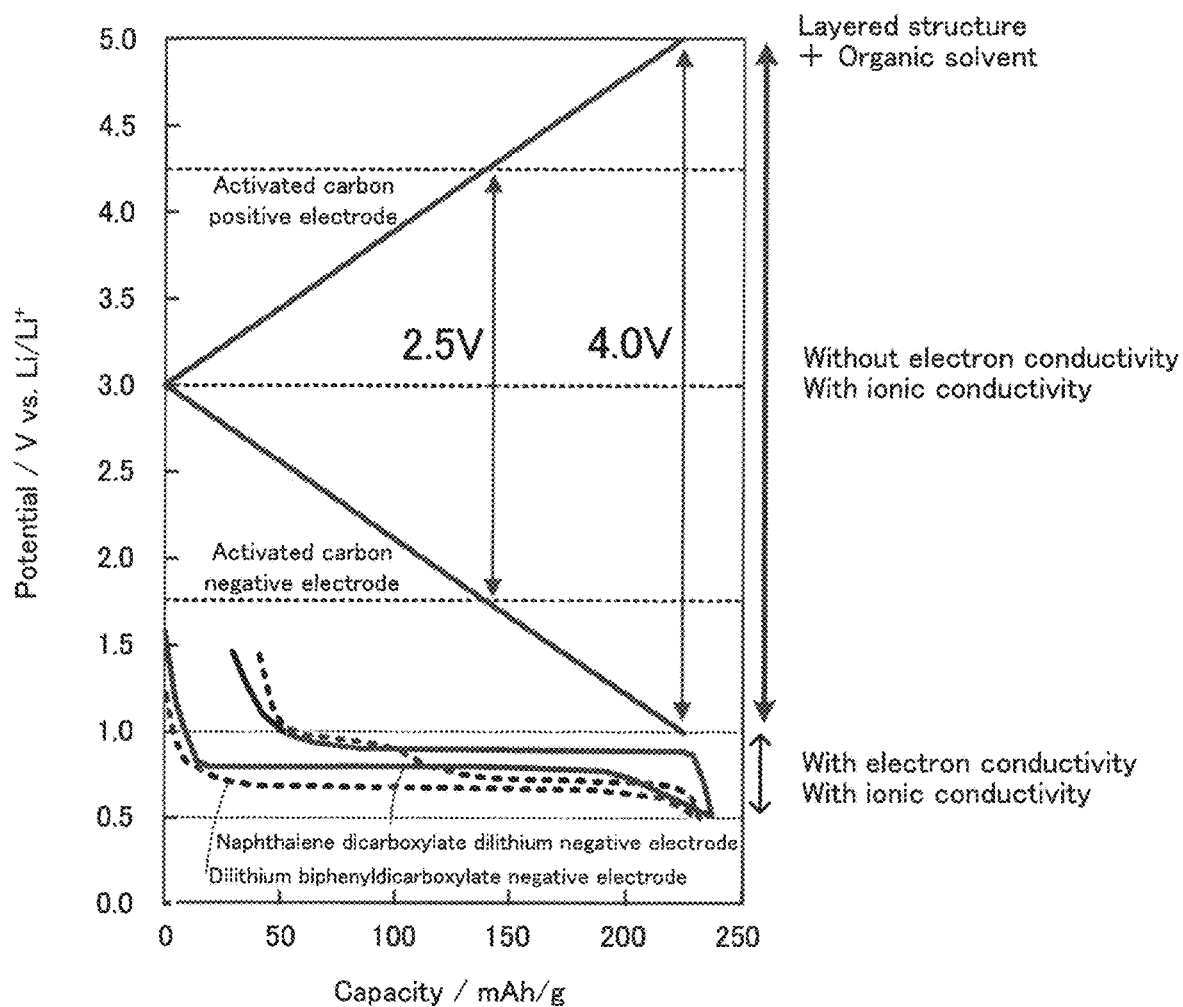
FIG. 2 is a graph showing the relationship between operating potentials of layered structures, a positive electrode active material, and a negative electrode active material.
Figure 3:
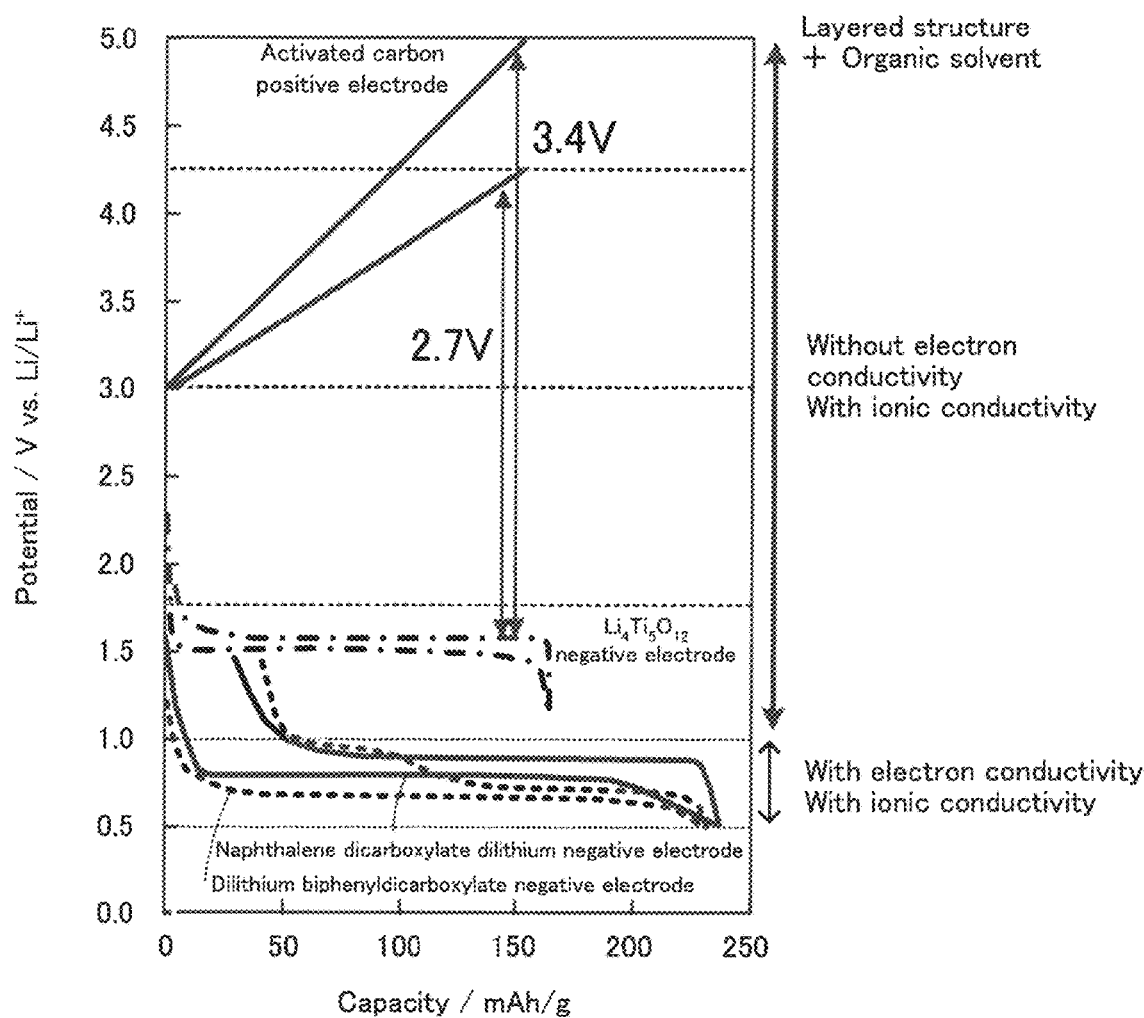
FIG. 3 is a graph showing the relationship between operating potentials of layered structures, a positive electrode active material, and a negative electrode active material.
Figure 4:
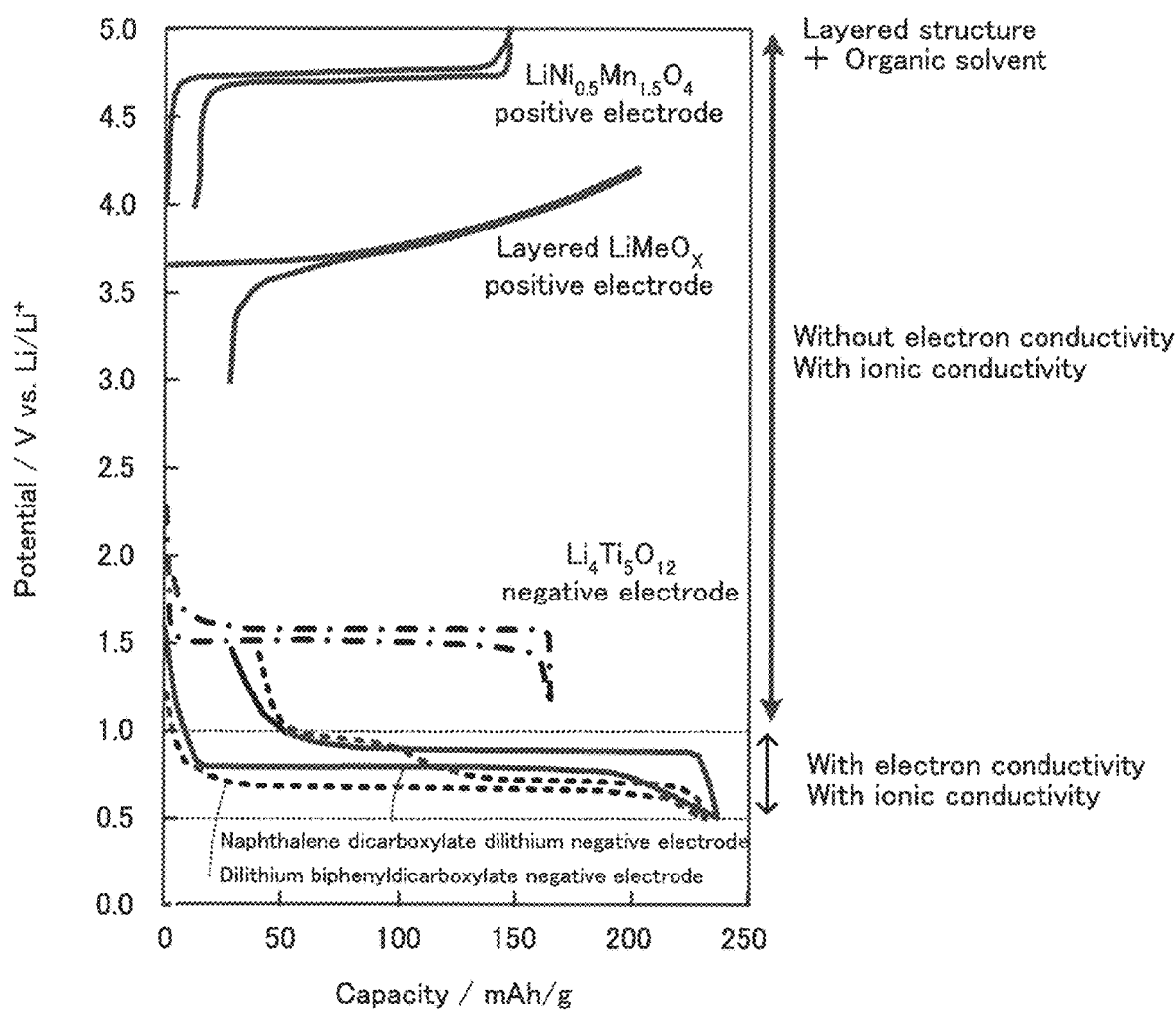
FIG. 4 is a graph showing the relationship between operating potentials of layered structures, positive electrode active materials, and a negative electrode active material.

The layered structure as described above is capable of absorbing and releasing alkali metal ions in a predetermined potential range. The layered structure, if used as an electrolyte, is preferably used for an electricity storage device that operates in a potential range outside the predetermined potential range. FIGS. 2 to 4 are graphs showing the relationship between operating potentials of layered structures and positive and negative electrode active materials in electrodes. In FIG. 2, an electric double-layer capacitor containing activated carbon as active and negative electrode active materials is given as an example. In FIG. 3, a hybrid capacitor containing activated carbon as a positive electrode active material and lithium-titanium composite oxide as a negative electrode active material is given as an example. In FIG. 4, a lithium-ion secondary battery containing $LiNi_{0.5}Mn_{1.5}O_4$ or layered $LiMeO_X$ (e.g., Me is at least one of Co, Ni, and Mn; X=2) as a positive electrode active material and $Li_4Ti_5O_{12}$ as a negative electrode active material is given as an example. In FIGS. 2 to 4, operating potentials of dilithium naphthalenedicarboxylate and dilithium biphenyldicarboxylate used as layered structures are shown. These layered structures absorb and release alkali metal (lithium) ions at potentials of 0.5 V or more and 1.0 V or less versus lithium reference. On the other hand, at potentials of more than 1.0 V versus lithium reference, the layered structures, while having ionic conductivity due to the coexistence of the organic solvent, have no electron conductivity and act, for example, as solid electrolytes. Thus, the electrolyte can presumably be used for an electricity storage device when used in combination with a negative electrode active material that provides a negative electrode having a potential of more than 1.0 V, more preferably 1.2 V or more, versus lithium reference.

The imaginary component C" of a capacitance component at 20° C. of the electrolyte may be maximized in a frequency band ranging from 1 kHz to 10 kHz. The capacitance component can be evaluated as described below. The electric double-layer capacitance at electrode-electrolyte interfaces and frequency characteristics are determined from the results of an AC impedance measurement. The AC impedance measurement is performed using a test cell including an electrolyte and electrodes on opposite sides thereof at an open-circuit voltage of ±500 mV, a frequency range of 1 Hz to 100 kHz, and a measurement temperature in the range of −30° C. to 60° C. The electrochemical impedance (Z(f), f means frequency) at the interfaces measured when a DC polarization component is applied to the electrodes and a minute AC component is superimposed thereon is defined by a real part (Z'(f)) and an imaginary part (Z"(f)) as mathematical formula (1). When considered as a capacitor component (C(f)) versus frequency, the impedance can be expressed as mathematical formula (2). C(f) derived from mathematical formulae (1) and (2) can be expressed as mathematical formula (3). Mathematical formula (3) can be divided into capacitor components of a real part (C'(f)) represented by mathematical formula (4) and an imaginary part (C"(f)) represented by mathematical formula (5) (see NPL 1). From the frequency dependence of the real component of capacitance represented by mathematical formula (4), frequency characteristics of electric double layer formation can be determined because the C' component increases as the frequency decreases. The frequency dependence of the imaginary component of capacitance represented by mathematical formula (5) shows that as the frequency decreases, the C" component increases and is maximized in a certain region. By comparing frequencies (f=1/t) at maximum values, responsivities of electric double layers can quantitatively be compared. That is, the higher the frequency at the maximum value is, the more rapidly an electric double layer can be formed.

[Math. 1]

$$Z(f) = Z'(f) + jZ''(f) \quad \text{Mathematical formula(1)}$$

$$Z(f) = \frac{1}{j2\pi f C(f)} \quad \text{Mathematical formula(2)}$$

$$C(f) = \quad \text{Mathematical formula(3)}$$
$$\frac{1}{j2\pi \times Z(f)} = \frac{1}{j2\pi f \times (Z'(f) + jZ''(f))} = \frac{-(Z''(f) - jZ'(f))}{2\pi f |Z'(f)|^2}$$

$$C'(f) = \frac{-Z''(f)}{2\pi f |Z'(f)|^2} \quad \text{Mathematical formula(4)}$$

$$C''(f) = \frac{Z'(f)}{2\pi f |Z'(f)|^2} \quad \text{Mathematical formula(5)}$$

(Electricity Storage Device)

An electricity storage device disclosed in the present specification may include a positive electrode containing a positive electrode active material, a negative electrode containing a negative electrode active material, and the above-described electrolyte that is interposed between the positive electrode and the negative electrode to conduct alkali metal ions. In the electricity storage device, at least one of the positive electrode and the negative electrode adsorbs and desorbs the ions to store and release electric charge. That is, the electricity storage device may be an electric double-layer capacitor or a hybrid capacitor.

The electrode active material that is contained in at least one of the positive electrode and the negative electrode and adsorbs and desorbs the ions may be made of a known material such as used for a capacitor or an alkali metal ion capacitor. For example, the electrode active material may be a carbon material having a specific surface area of 100 m²/g or more. Examples of carbon materials include, but are not limited to, activated carbons, cokes, glassy carbons, graphites, non-graphitizable carbons, pyrolytic carbons, carbon fibers, carbon nanotubes, and polyacenes. Of these, activated carbons, which have high specific surface areas, are preferred. The activated carbon used as a carbon material preferably has a specific surface area of 1000 m²/g or more, more preferably 1500 m²/g or more. A specific surface area of 1000 m²/g or more can provide an increased discharge capacity. Although the specific surface area of the activated carbon is preferably as high as possible, it is preferably 3000 m²/g or less and may be 2000 m²/g or less for ease of manufacturing. The electrode active material is considered to adsorb and desorb ions supplied from the electrolyte to store and release electric charge.

The positive electrode may contain a positive electrode active material that absorbs and releases alkali metal ions serving as carriers. The negative electrode may contain a negative electrode active material that absorbs and releases alkali metal ions serving as carriers. In the electricity storage device, the negative electrode active material may have an operating potential higher than the operating potential during charge and discharge of the layered structure contained in the electrolyte (see FIGS. 2 to 4). A negative electrode active material having such a potential can more effectively inhibit the layered structure from being reduced to have electron conductivity.

The positive electrode of the electricity storage device may be formed, for example, by mixing together a positive electrode active material, a conductor, and a binder, adding a suitable solvent to the mixture to prepare a paste-like positive electrode mixture, applying the paste-like positive electrode mixture to a surface of a current collector, followed by drying, and optionally compressing the dried electrode mixture for higher electrode density. The positive electrode active material may be, for example, a sulfide containing a transition metal element or an oxide containing lithium and a transition metal element. Specifically, transition metal sulfides such as $TiS_2$, $TiS_3$, $MoS_3$, and $FeS_2$; lithium-manganese composite oxides represented by basic composition formulae such as $Li_{(1-x)}MnO_2$ (e.g., 0≤x≤1, the same shall apply hereinafter) and $Li_{(1-x)}Mn_2O_4$; lithium-cobalt composite oxides represented by basic composition formulae such as $Li_{(1-x)}CoO_2$; lithium-nickel composite oxides represented by basic composition formulae such as $Li_{(1-x)}NiO_2$; lithium-nickel-cobalt-manganese composite oxides represented by basic composition formulae such as $Li_{(1-x)}Ni_aCo_bMn_cO_2$ (a+b+c=1); lithium-vanadium composite oxides represented by basic composition formulae such as $LiV_2O_3$; and transition metal oxides represented by basic composition formulae such as $V_2O_3$ can be used. Of these, transition metal composite oxides of lithium, such as $LiCoO_2$, $LiNiO_2$, $LiMnO_2$, and $LiNi_{0.5}Mn_{1.5}O_3$, are preferred. The term "basic composition formula" implies that other elements such as Al and Mg may be contained.

The conductor contained in the positive electrode may be any electron-conducting material that does not adversely affect the battery performance of the positive electrode. For example, graphites such as natural graphite (flaky graphite, scaly graphite) and artificial graphite, acetylene black, carbon black, Ketjen black, carbon whisker, needle coke, carbon fiber, and metals (e.g., copper, nickel, aluminum, silver, and gold) can be used alone or as a mixture of two or more. Of these conductors, carbon black and acetylene black are preferred from the viewpoint of electron conductivity and coatability. The binder functions to bind active material particles and conductor particles together. For example, fluorine-containing resins such as polytetrafluoroethylene (PTFE), polyvinylidene fluoride (PVDF), and fluororubbers, thermoplastic resins such as polypropylene and polyethylene, ethylene-propylene-diene monomer (EPDM) rubbers, sulfonated EPDM rubbers, and natural butyl rubber (NBR) can be used alone or as a mixture of two or more. Water-based binders such as cellulose binders and aqueous styrene-butadiene rubber (SBR) dispersions can also be used. Examples of solvents for dispersing the positive electrode active material, the conductor, and the binder includes organic solvents such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The active material may also be slurried, for example, with an SBR latex in water with a dispersant and a thickener added. Examples of thickeners include polysaccharides such as carboxymethylcellulose and methylcellulose, which can be used alone or as a mixture of two or more. Examples of coating techniques include roller coating using applicator rollers, screen coating, doctor blade coating, spin coating, and bar coating, any of which can be used to provide any thickness and shape. Examples of current collectors include aluminum, titanium, stainless steel, nickel, iron, baked carbon, conductive polymers, conductive glass, and collectors formed by surface-treating aluminum, copper, and the like with carbon, nickel, titanium, silver, and the like for improved adhesion, conductivity, and oxidation resistance. These collectors can also be surface-treated by oxidation. Examples of shapes of collectors include foils, films, sheets, nets, punched or expanded shapes, laths, porous shapes, foams, and fiber bundles. The collector has a thickness of, for example, 1 to 500 µm.

The negative electrode of the electricity storage device may be formed in such a manner that a negative electrode active material and a current collector are brought into close contact with each other or may be formed, for example, by mixing together a negative electrode active material, a conductor, and a binder, adding a suitable solvent to the mixture to prepare a paste-like negative electrode mixture, applying the paste-like negative electrode mixture to a surface of a current collector, followed by drying, and optionally compressing the dried electrode mixture for higher electrode density. The negative electrode preferably has a charge-discharge potential of more than 1.0 V, more preferably 1.2 V or more, versus lithium reference. The negative electrode active material may be, for example, a metal oxide of a transition element or a composite oxide containing a transition element. Examples of metal oxides include $Nb_2O_5$, $NbO_2$, and $RuO_2$, one or more of which may be used. Examples of composite oxides include lithium-titanium composite oxides. Among these negative electrode active materials, lithium-titanium composite oxides are preferred in view of chemical stability. The conductor, the binder, and the solvent used for the negative electrode may be the same as those used for the positive electrode. Examples of negative electrode current collectors include copper, nickel, stainless steel, titanium, aluminum, baked carbon, conductive polymers, conductive glass, Al—Cd alloys, and collectors formed by surface-treating copper and the like with carbon, nickel, titanium, silver, and the like for improved adhesion, conductivity, and reduction resistance. These collectors can also be surface-treated by oxidation.

The shape of the current collector may be the same as that of the positive electrode current collector.

The electricity storage device includes the above-described electrolyte between the positive electrode and the negative electrode. The electricity storage device may also include a separator, in addition to the above-described electrolyte, between the positive electrode and the negative electrode. The separator may have any composition that withstands the environment in which the electricity storage device is used. Examples include polymer nonwoven fabrics such as polypropylene nonwoven fabrics and polyphenylene sulfide nonwoven fabrics and microporous films of olefin resins such as polyethylene and polypropylene. These may be used alone or in combination.

Figure 5:
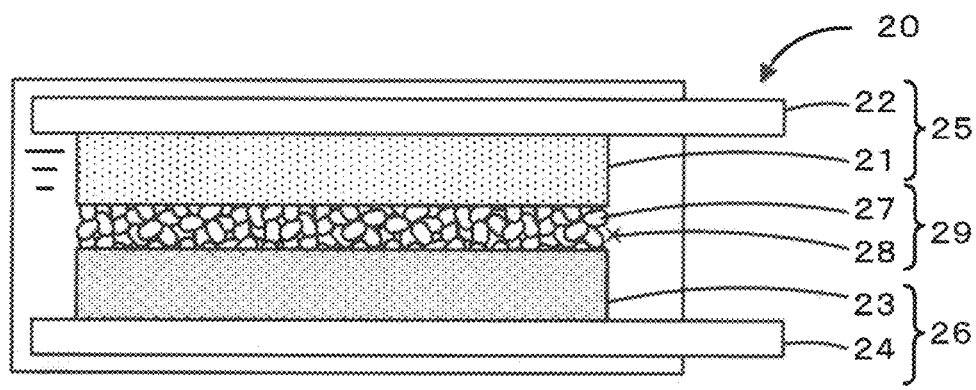
FIG. 5 is a schematic view of an exemplary electricity storage device 20.

The shape of the electricity storage device may be, for example, but is not limited to, coin-like, button-like, sheet-like, laminated, cylindrical, flat, or prismatic. The electricity storage device may also be of large type for use in, for example, an electric vehicle. FIG. 5 is a schematic view of an exemplary electricity storage device 20. The electricity storage device 20 includes a positive electrode 25, a negative electrode 26, and an electrolyte 29. The positive electrode 25, the negative electrode 26, and the electrolyte 29 are encased in a cell casing. The positive electrode 25 is constituted by a positive electrode mixture layer 21 containing a positive electrode active material and a positive electrode current collector 22 on which the positive electrode mixture layer 21 is formed. The negative electrode 26 is constituted by a negative electrode mixture layer 23 containing a negative electrode active material and a negative electrode current collector 24. The electrolyte 29 is interposed between the positive electrode 25 and the negative electrode 26 to conduct alkali metal ions and constituted by an organic crystal layer 27 containing a layered structure of an aromatic dicarboxylic acid alkali metal salt and an organic solvent 28 introduced into voids in the organic crystal layer 27.

Figure 6:
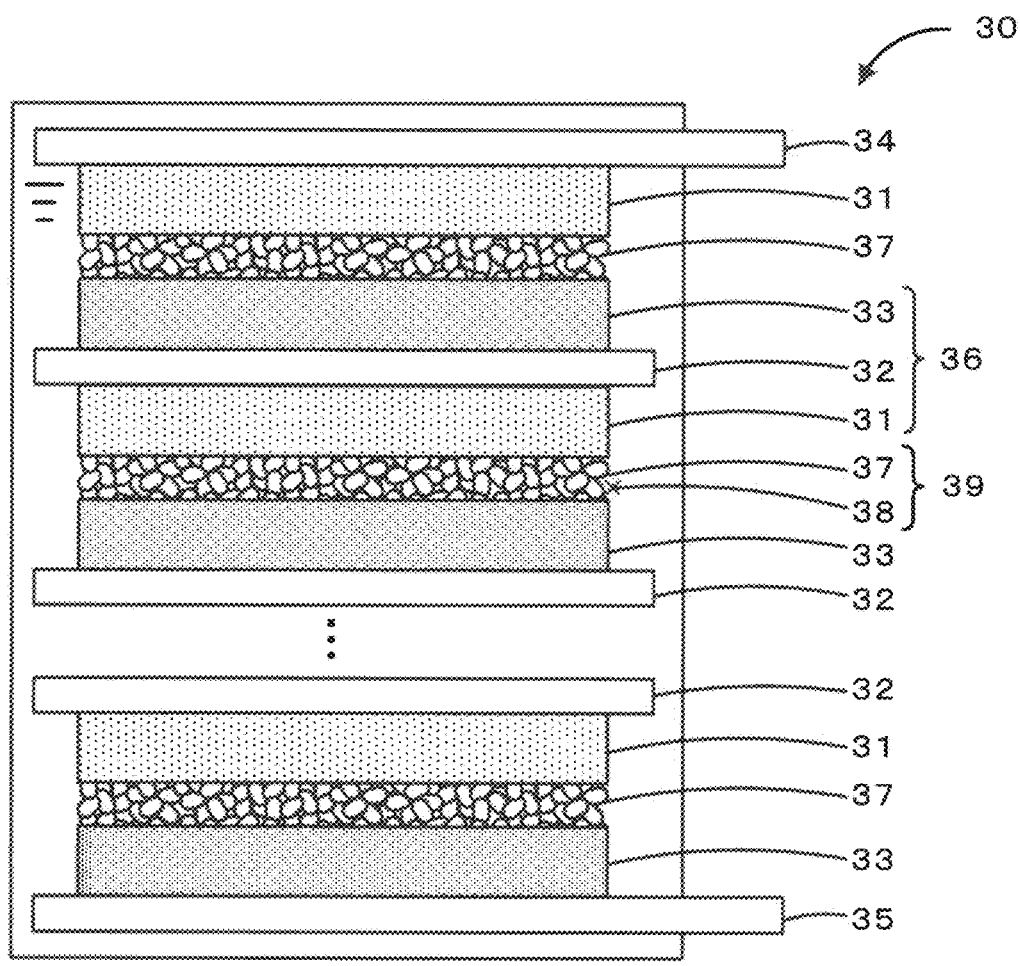
FIG. 6 is a schematic view of an exemplary assembled battery 30 including a plurality of bipolar electrodes 36 stacked on top of each other.

Alternatively, the electricity storage device may be an assembled battery 30 including bipolar electrodes 36 stacked on top of each other. FIG. 6 is a schematic view of an exemplary assembled battery 30 including a plurality of bipolar electrodes 36 stacked on top of each other. The assembled battery 30 includes bipolar electrodes 36, each including a current collector 32 having, on one surface thereof, a positive electrode mixture layer 31 containing a positive electrode active material and, on the other surface thereof, a negative electrode mixture layer 33 containing a negative electrode active material, and an electrolyte 39 interposed between the positive electrode mixture layer 31 and an negative electrode mixture layer 33 on an adjacent current collector 32. The plurality of bipolar electrodes 36 are stacked on top of each other with the electrolyte 39 interposed therebetween. A positive electrode collector terminal 34 is disposed on the positive-electrode end of the stack of the positive electrode mixture layer 31, the negative electrode mixture layer 33, and an organic crystal layer 37, and a negative electrode collector terminal 35 is disposed on the negative-electrode end. As the positive electrode mixture layer 31, the negative electrode mixture layer 33, the organic crystal layer 37, and the electrolyte 39, those described above may be used as appropriate. The current collector 32 may be made of a metal that undergoes an alloying reaction with an alkali metal at a potential lower than the oxidation-reduction potential of the negative electrode active material. The current collector 32 may dissolve at a potential higher than the oxidation-reduction potential of the positive electrode active material. The current collector 32 may be any current collector that is chemically and thermally stable at the operating potentials and the operating temperatures of the positive electrode active material and the negative electrode active material. The current collector 32 may be made of, for example, a noble metal, aluminum, or an aluminum alloy, and is preferably made of a metal containing aluminum. For example, aluminum is generally stable at a charge-discharge potential of a positive electrode and thus is used for a positive electrode current collector. The alloying reaction of aluminum with lithium occurs at 0.27 V versus lithium metal reference. Thus, aluminum can also be used for a negative electrode that undergoes a charge-discharge reaction at a potential more than 1.0 V versus lithium reference. Therefore, aluminum metal can be used as a current collector on which a positive electrode mixture layer and a negative electrode mixture layer are formed. The assembled battery 30 does not need positive and negative electrode current collectors made of different materials, which reduces the complexity involved in the manufacturing process, including material procurement and separate formation of positive and negative electrodes, and also reduces the volume of the collectors in the electricity storage device.

(Method for Producing Electricity Storage Device)

Figure 7A:
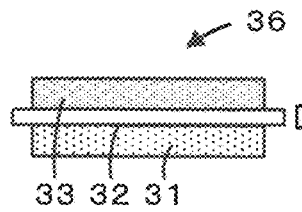
FIGS. 7A to 7E illustrate an exemplary process for producing an assembled battery 30.
Figure 7B:
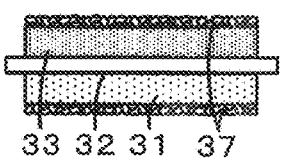
Figure 7C:
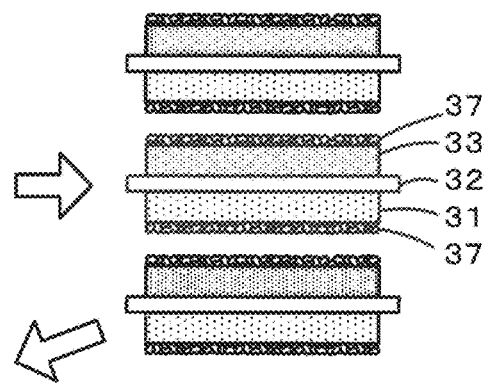
Figure 7D:
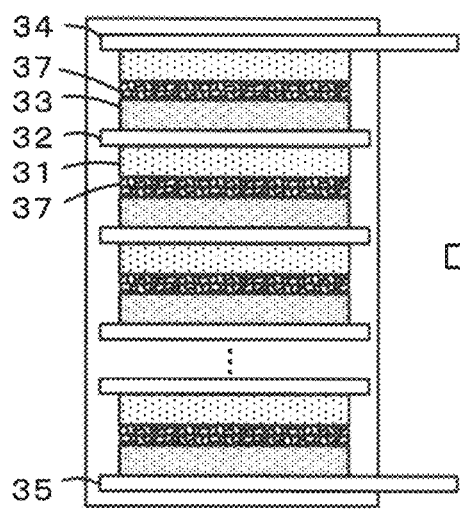
Figure 7E:
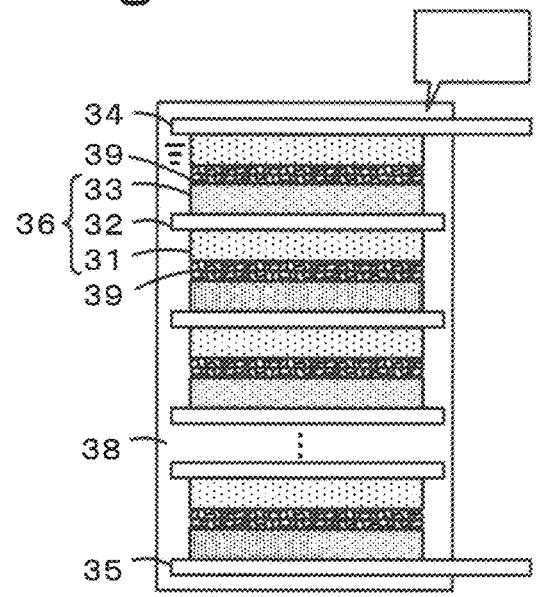

A method for producing an electricity storage device involves producing an assembled battery 30 in which alkali metal ions serve as carriers. The method for producing an electricity storage device may include, for example, a mixture-layer forming step, a crystal-layer forming step, a stacking step, and an introducing step. FIGS. 7A to 7e illustrate an exemplary process for producing the assembled battery 30. FIG. 7A illustrates the mixture-layer forming step. FIG. 7B illustrates the crystal-layer forming step. FIGS. 7C and 7D illustrate the stacking step. FIG. 7E illustrates the introducing step. One or more of these steps may be omitted: for example, a current collector having mixture layers formed thereon may be used to omit the mixture-layer forming step, and the step of introducing an organic solvent may be performed in a different section to omit the introducing step.

(Mixture-Layer Forming Step)

In this step, a positive electrode mixture layer 31 containing a positive electrode active material is formed on one surface of a current collector 32, and a negative electrode mixture layer 33 containing a negative electrode active material is formed on the other surface of the current collector 32, thereby fabricating a bipolar electrode 36 (FIG. 7A). As the positive electrode mixture layer 31 and the negative electrode mixture layer 33, those described above in the section of Electricity storage device may be used as appropriate. The current collector 32 is preferably made of aluminum or an aluminum alloy, as described above. The current collector 32 may have a thickness in the range of, for example, 1 to 50 μm. The thicknesses of the positive electrode mixture layer 31 and the negative electrode mixture layer 33 to be formed may be appropriately set depending on the intended use and capacity of the electricity storage device and may be in the range of 1 to 50 μm. The positive electrode mixture layer 31 and the current collector 32 may be formed, for example, by roller coating using an applicator roll or the like, screen coating, doctor blade coating, spin coating, or bar coating.

(Crystal-Layer Forming Step)

In this step, an organic crystal layer 37 having the above-described layered structure is formed on the surface of the positive electrode mixture layer 31, the surface of the negative electrode mixture layer 33, or both (FIG. 7B). In this step, the organic crystal layer 37 may be formed on the surface of the positive electrode mixture layer 31 and the surface of the negative electrode mixture layer 33, or the organic crystal layer 37 may be formed on either the positive electrode mixture layer 31 or the negative electrode mixture layer 33. To provide a good mixture layer-organic crystal layer interface, the organic crystal layer 37 is preferably formed on both the surface of the positive electrode mixture layer 31 and the surface of the negative electrode mixture layer 33. The layered structure used for the organic crystal layer 37 preferably absorbs alkali metal only into an alkali metal element layer. The layered structure used for the organic crystal layer 37 is preferably not provided with conductivity. The layered structure of an aromatic dicarboxylic acid alkali metal salt is an insulating substance, and thus if the layered structure does not absorb alkali metal and is not provided with conductivity, the layered structure is unlikely to absorb and release alkali metal ions and to act as an active material and thus is suitable for use for an electrolyte. The organic crystal layer may be formed on the surfaces of the mixture layers, for example, by coating or pressing. The thickness of the organic crystal layer to be formed may be appropriately set depending on the intended use and capacity of the electricity storage device and may be, for example, 5 μm or more and 50 μm or less. When the organic crystal layer 37 is formed on the surface of the positive electrode mixture layer 31 and the surface of the negative electrode mixture layer 33, as illustrated in FIG. 7B, the thickness of the organic crystal layer 37 to be formed is set taking into account that the thickness will double in the subsequent stacking step. In this step, the organic crystal layer 37 formed is preferably packed with the layered structure at a volume ratio of 0.8 or more, more preferably 0.85 or more. A binder may be added to the organic crystal layer 37. The binder is preferably added in an amount of, for example, 0.5 mass % or more and 5 mass % or less relative to the amount of the layered structure. As the binder, those described above in the section of Electricity storage device may be used as appropriate.

(Stacking Step)

In this step, a stack of a plurality of bipolar electrodes 36 each having the organic crystal layers 37 formed thereon is fabricated (FIG. 7C). In this step, a positive electrode collector terminal 34 is disposed on an end where the positive electrode mixture layer 31 is formed, and a negative electrode collector terminal 35 is disposed on an end where the negative electrode mixture layer 33 is formed. The resulting stack is put in a cell casing (FIG. 7D).

(Introducing Step)

In this step, an organic solvent 38 is introduced into the organic crystal layers 37 to form an electrolyte 39, thereby producing an assembled battery 30 (electricity storage device) (FIG. 7E). In this step, the organic solvent 38 is introduced into the cell casing containing the stack. As the organic solvent 38, those described above in the section of Electricity storage device may be used as appropriate. The organic solvent need not contain a supporting electrolyte. Using an organic solvent 38 containing no supporting electrolytes advantageously prevents short-circuiting (liquid junction) between the plurality of bipolar electrodes 36 through an electrolytic solution. According to this production method, electricity storage devices can be produced by stacking the plurality of bipolar electrodes 36 with the organic crystal layer 37 interposed therebetween and then injecting the organic solvent 38, and thus the electricity storage devices can efficiently be connected with each other.

The electricity storage device described in detail above provides an electricity storage device including a novel electrolyte that forms a good electric double layer. Presumably, the electrolyte acts as an ion conductor because the coexistence of the layered structure of an aromatic dicarboxylic acid alkali metal salt and the organic solvent allows alkali metal ions in the alkali metal element layer of the layered structure to be conducted. The electrolyte, in which the solid layered structure serves as a supporting electrolyte, is able to exhibit ionic conductivity when no other supporting electrolytes are contained. Thus, the electrolyte, when used, for example, in an assembled battery including bipolar electrodes, causes no short circuiting (liquid junction) between the bipolar electrodes through an organic solvent and enables an electricity storage device to be produced more easily by a simple process. The electrolyte forms good electric double layers at the interfaces with the electrodes, which can presumably enhance the charge/discharge response of the electricity storage device, for example, a capacitor.

It should be understood that the present disclosure is not limited to the embodiments described above and can be practiced in various aspects without departing from the technical idea of the present disclosure.

EXAMPLES

Specific examples of implementation of electrolytes and electricity storage devices will be described below as Examples. It should be understood that the present disclosure is not limited to these examples and can be practiced in various aspects without departing from the technical idea of the present disclosure.

(Synthesis of Layered Structure Having Fused Polycyclic Structure)

As starting materials, 2,6-naphthalenedicarboxylic acid and lithium hydroxide monohydrate ($LiOH \cdot H_2O$) were used. First, methanol was added to lithium hydroxide monohydrate, and the resulting mixture was stirred. After the lithium hydroxide monohydrate was dissolved, 2,6-naphthalenedicarboxylic acid was added, and the resulting mixture was stirred for 1 hour. After stirring, the solvent was removed, and the residue was dried under vacuum at 150° C. for 16 hours to obtain a white powder sample, that is, dilithium 2,6-naphthalenedicarboxylate (also referred to as a Naph powder). The Naph powder was subjected to powder X-ray diffraction analysis. The analysis was performed with an X-ray diffractometer (RINT2200 manufactured by Rigaku Corporation) using CuKα radiation (wavelength: 1.54051 Å). The powder, which was assumed to be a monoclinic crystal belonging to the space group $P2_1/c$, exhibited clear (001), (111), (102), and (112) peaks, suggesting that a layered structure of lithium layers and organic backbone layers was formed. Since the powder was a monoclinic crystal belonging to the space group $P2_1/c$, it was presumed that the powder had a structure in which four oxygen atoms in different aromatic dicarboxylic acid molecules and lithium together formed four coordination bonds and that an interaction due to π-electron conjugated clouds took place in the organic backbone portion.

(Synthesis of Layered Structure Having Non-Fused Polycyclic Structure)

As starting materials, 4,4'-biphenyldicarboxylic acid and lithium hydroxide monohydrate ($LiOH \cdot H_2O$) were used. First, methanol was added to lithium hydroxide monohydrate, and the resulting mixture was stirred. After the lithium hydroxide monohydrate was dissolved, 4,4'-biphenyldicarboxylic acid was added, and the resulting mixture was stirred for 1 hour. After stirring, the solvent was removed, and the residue was dried under vacuum at 150° C. for 16 hours to obtain a white powder sample, that is, dilithium 4,4'-biphenyldicarboxylate (also referred to as a Bph powder). The Bph powder was subjected to powder X-ray diffraction analysis. The analysis results were similar to those of the Naph powder.

(Fabrication of Test Cell)

Figure 8:
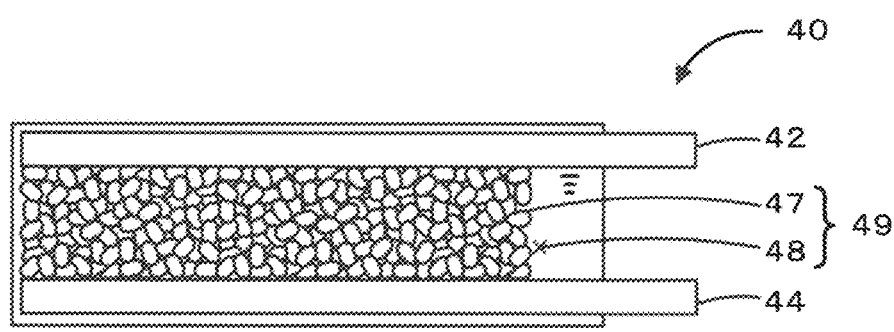
FIG. 8 illustrates a test cell 40.

The Naph powder was mixed with carboxymethylcellulose serving as a binder at a mass ratio of 98:2, and the resulting mixture was dispersed by adding an appropriate amount of water serving as a dispersant to form a slurry. The slurry was uniformly applied to a 10-μm-thick copper foil current collector and dried by heating at 120° C. under vacuum to fabricate a coated sheet including an organic crystal layer of the Naph powder. The organic crystal layer of the coated sheet was packed at a percentage of 86% by volume. Dimethyl sulfoxide (DMSO), an organic solvent, was added onto the organic crystal layer side, and a copper foil current collector was disposed so as to face the organic crystal layer to fabricate a test cell having a current collector/electrolyte/current collector configuration. FIG. 8 illustrates a test cell 40. The test cell 40 is constituted by a current collector 42, a current collector 44, and an electrolyte 49 interposed between the current collectors 42 and 44. The electrolyte 49 is constituted by an organic crystal layer 47 and an organic solvent 48 introduced into the organic crystal layer 47.

Examples 1 and 2

An electrolyte of Example 1 was obtained using an organic crystal layer including a layered structure of the Naph powder and dimethyl sulfoxide (DMSO) as an organic solvent. An electrolyte of Example 2 was obtained using an organic crystal layer including a layered structure of the Naph powder and propylene carbonate (PC) as an organic solvent.

Comparative Examples 1 and 2

An electrolyte of Comparative Example 1 was obtained in the same manner as in Example 1 except that no organic solvents were added. A cellulose porous nonwoven fabric (manufactured by Nippon Kodoshi Corporation) impregnated with dimethyl sulfoxide was used in Comparative Example 2.

Comparative Example 3

An electrolyte of Comparative Example 3 was obtained in the same manner as in Example 1 except that the Naph powder was subjected to a Li-absorption treatment using the following Li pre-doping solution.

(Li Pre-Doping)

Naphthalene was dissolved in tetrahydrofuran (THF) to a concentration of 0.1 mol/L, and metallic lithium in an amount equivalent to 0.1 mol/L was then added to the solution. The solution was stirred to effect the reaction represented by formula (13) below, thereby preparing a dark-green Li pre-doping solution. A current collector on which an organic crystal layer formed using the Naph powder was formed was immersed in the Li pre-doping solution overnight, then took out of the Li pre-doping solution, washed with THF, and dried. As a result of this treatment, Naph was reduced, and Li ions were absorbed into Naph due to charge compensation, as represented by formula (14) below. In this state, the Naph powder is able to give and receive electrons and Li ions, as represented by the next formula (15), and can be used as an electrode active material. Usually, a layered structure of an aromatic dicarboxylic acid alkali metal salt is an insulator and cannot achieve Li-ion absorption through charge and discharge unless the layered structure is provided with conductivity, for example, by carbon coating. Using the Li pre-doping solution enables such a layered structure to absorb Li ions without being provided with conductivity.

[Chem. 5]

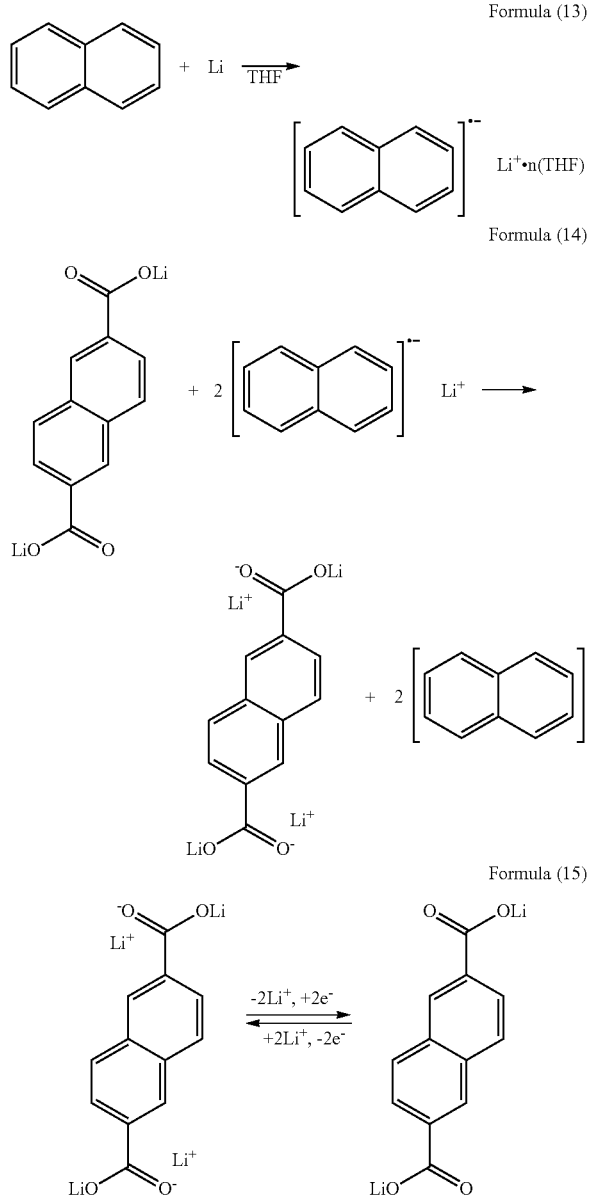

(Evaluation of Electrical Properties)

The electrical properties of the test cells were evaluated by AC impedance measurement. The test cells fabricated above were each measured using an AC impedance analyzer (Agilent 4294A) at an open-circuit voltage with an amplitude of ±500 mV, a frequency range of 1 Hz to 100 kHz, and a measurement temperature of −30° C. to 60° C., and ionic conductivity (S/cm) was calculated from the resistance between the current collectors.

(Results and Discussions)

Figure 9:
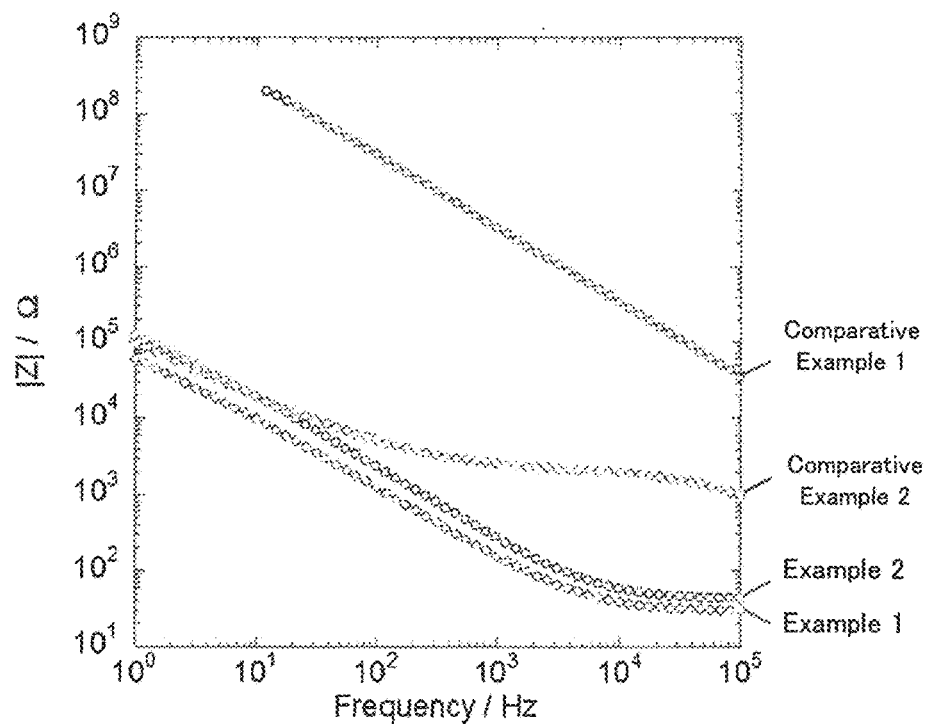
FIG. 9 is a graph of resistance versus frequency of Examples 1 and 2 and Comparative Examples 1 and 2.
Figure 10:
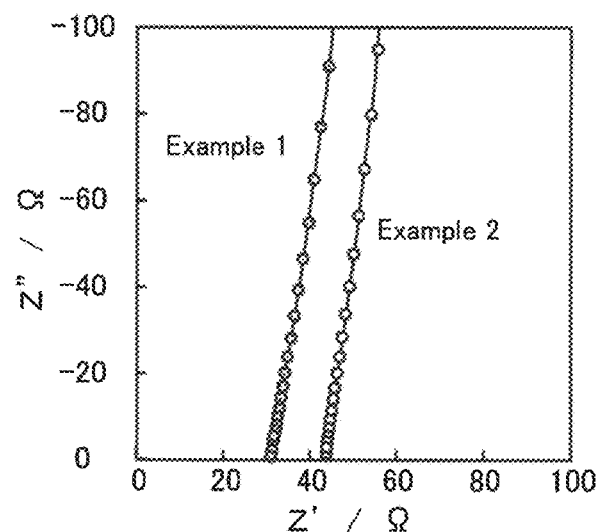
FIG. 10 shows the results of impedance behavior measurements of Examples 1 and 2.
Figure 11:
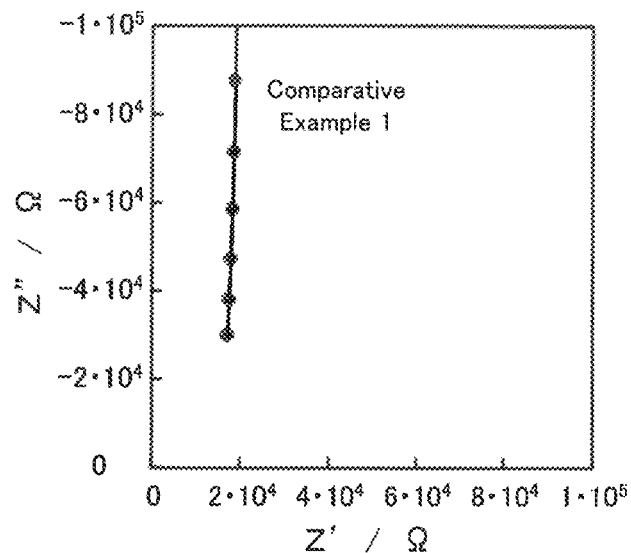
FIG. 11 shows the results of an impedance behavior measurement of Comparative Example 1.
Figure 12:
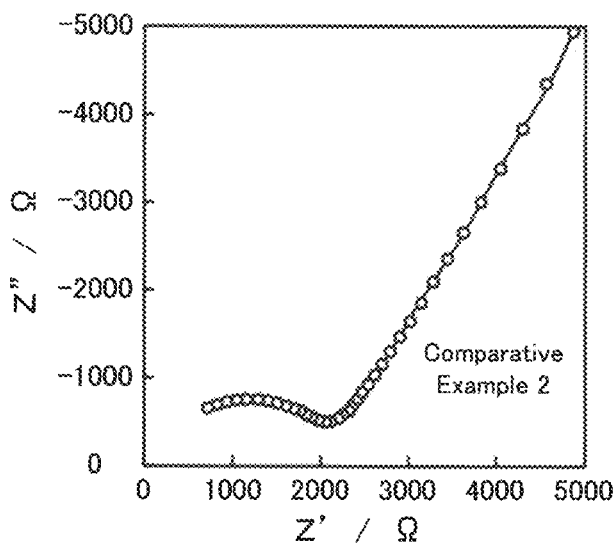
FIG. 12 shows the results of an impedance behavior measurement of Comparative Example 2.
Figure 13:
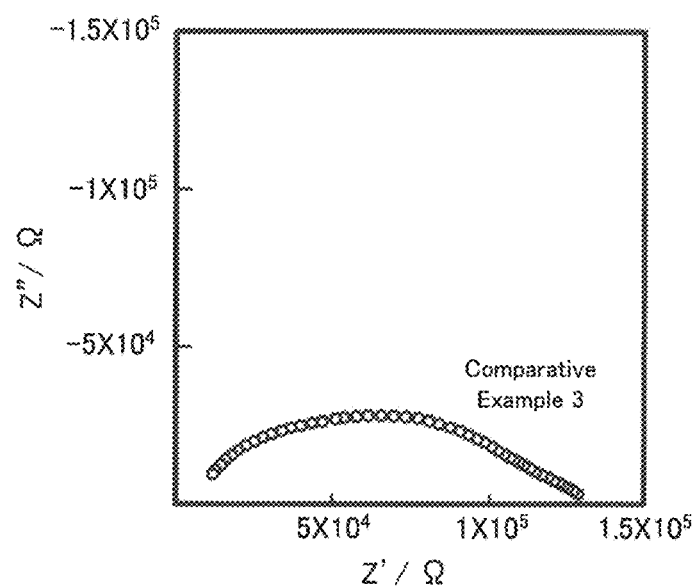
FIG. 13 shows the results of an impedance behavior measurement of Comparative Example 3.

FIG. 9 is a graph of resistance versus frequency of Examples 1 and 2 and Comparative Examples 1 and 2. FIG. 10 shows the results of impedance behavior measurements of Examples 1 and 2. FIG. 11 shows the results of an impedance behavior measurement of Comparative Example 1. FIG. 12 shows the results of an impedance behavior measurement of Comparative Example 2. FIG. 13 shows the results of an impedance behavior measurement of Comparative Example 3. As shown in FIG. 9, the resistance at high frequency ($10^5$ Hz), which is correlated with ionic conduction, was high in Comparative Examples 1 and 2. By contrast, in Examples 1 and 2, the resistance was as low as $10^2 \Omega$ or less, suggesting that high ionic conductivity was exhibited. As shown in FIGS. 11 and 12, ionic conductivity was low in the case of a layered structure alone or a high-dielectric organic solvent alone. By contrast, as shown in FIG. 10, the electrolytes of Examples 1 and 2, in each of which a layered structure and an organic solvent coexisted, were determined to have significantly improved ionic conductivity (see the number of digits on the horizontal axis of FIG. 10). The ionic conduction is considered as follows. It is presumed that in the electrolytes of Examples 1 and 2, constituent Li ions were conducted through the layered structure because no supporting electrolytes were dissolved in the organic solvent. Since ionic conductivity was not exhibited in Comparative Example 1, it is presumed that Li-ion conduction was induced by the coexistence of the layered structure and the organic solvent (DMSO), that is, the presence of the organic solvent. As shown in FIG. 13, the reduced layered structure of an aromatic dicarboxylic acid alkali metal salt of Comparative Example 3 showed impedance behavior having a circular arc component. The circular arc component of impedance behavior is exhibited when electrons and ions are conducted in parallel. It is presumed that in Comparative Example 3, electrons and ions were conducted because Li ions were able to be absorbed and released. These results demonstrate that the electrolytes of Examples 1 and 2 had no electron conductivity and had ionic conductivity alone.

Figure 14:
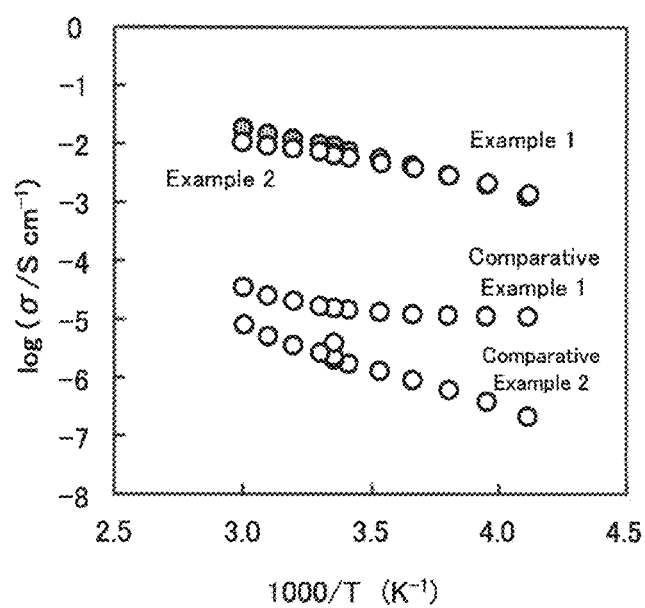
FIG. 14 shows Arrhenius plots of Examples 1 and 2 and Comparative Examples 1 and 2.

FIG. 14 shows Arrhenius plots of Examples 1 and 2 and Comparative Examples 1 and 2. Table 1 shows the details of samples and the ionic conductivity (S/cm) at 25° C. of Examples 1 and 2 and Comparative Examples 1 to 3. As shown in Table 1 and FIG. 14, high ionic conductivity was constantly exhibited in a relatively wide range in Examples 1 and 2 as compared to Comparative Examples 1 and 2.

TABLE 1

| | Electrolyte | | Ionic conductivity |
| --- | --- | --- | --- |
| | Layered structure[1] | Organic solvent | (25° C.) mS/cm |
| Example 1 | Naph | Dimethyl sulfoxide | 8.9 |
| Example 2 | Naph | Propylene carbonate | 7.1 |
| Comparative example 1 | Naph | — | $1.6 \times 10^{-2}$ |
| Comparative example 2 | — | Dimethyl sulfoxide | $4.1 \times 10^{-3}$ |
| Comparative example 3 | Naph-Li | Dimethyl sulfoxide | $1.6 \times 10^{-2}$ |

[1] Naph: Naphthalene dicarboxylate dilithium, Naph-Li: Li pre-doped Naphthalene dicarboxylate dilithium (Evaluation of Electric Double Layer)

Next, whether the electrolyte forms an electric double layer and the speed of response thereof were investigated. The test cells of Examples 1 and 2 and Comparative Examples 1 and 2 described above were used, and responsivity of the electric double layer was investigated using the mathematical formulae (3) to (5) described above.

Comparative Example 4

A test cell of Comparative Example 4 was fabricated in the same manner as in Example 1 except using a non-aqueous electrolytic solution prepared by adding $LiPF_6$ serving as a supporting electrolyte to a non-aqueous solvent to a concentration of 1.0 mol/L, the solvent being a mixture of ethylene carbonate, dimethyl carbonate, and ethyl methyl carbonate at a volume ratio of 30:40:30.

(Results and Discussions)

Figure 15A:
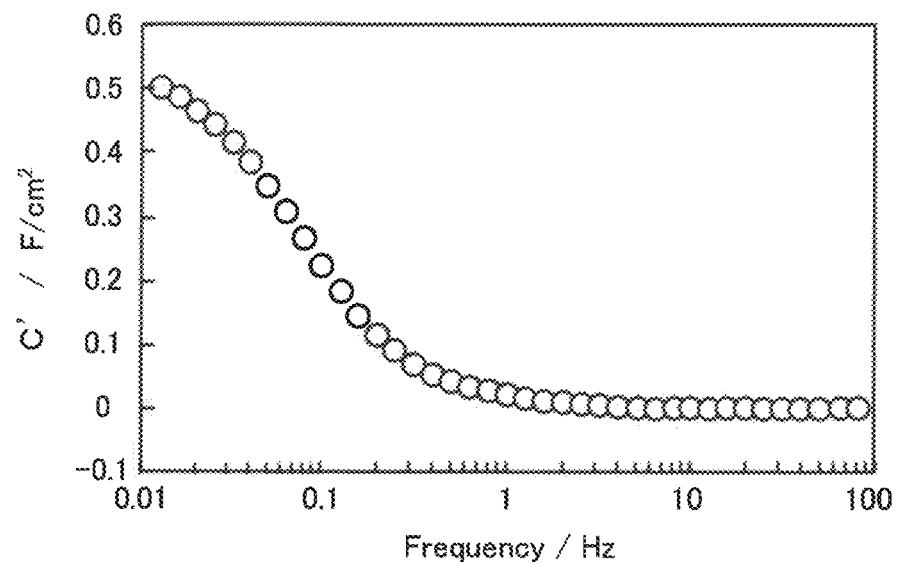
FIGS. 15A and 15B show models of a real component C' and an imaginary component C" versus frequency.
Figure 15B:
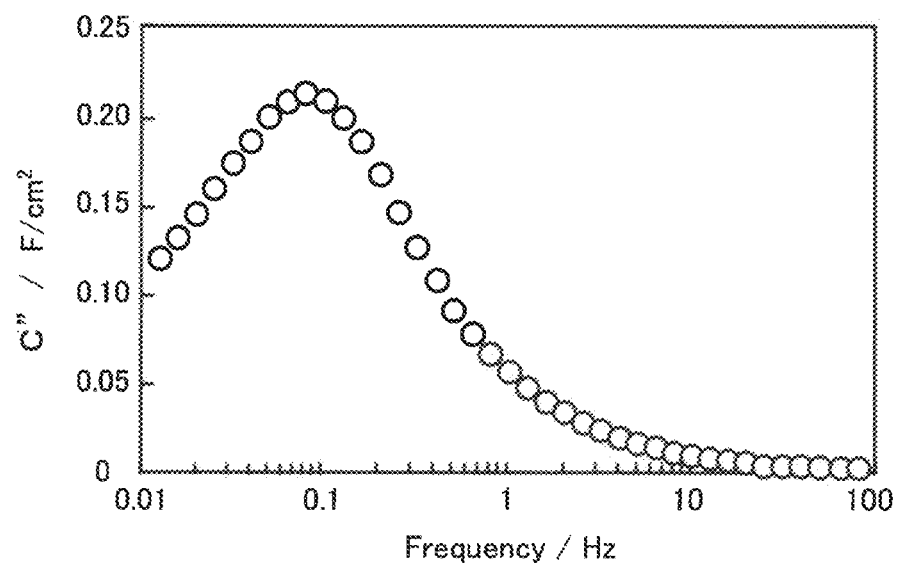
Figure 16A:
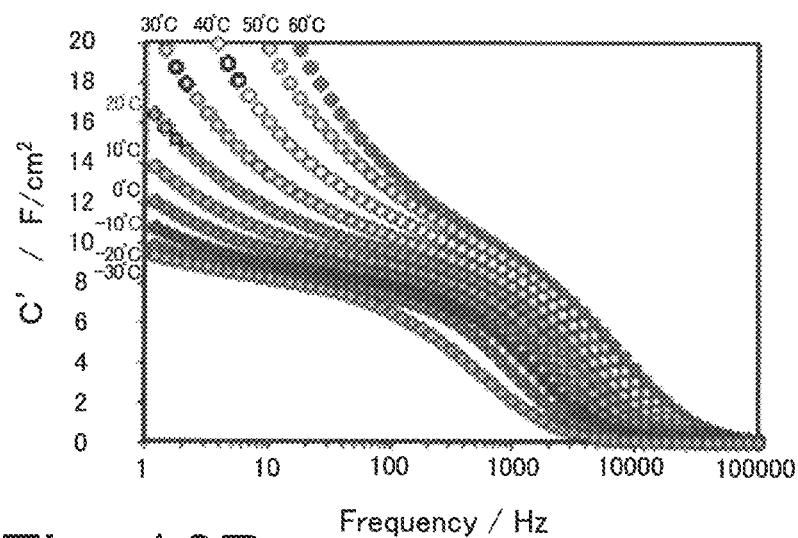
FIGS. 16A and 16B show graphs of a real component C' and an imaginary component C" versus frequency of Example 1.
Figure 16B:
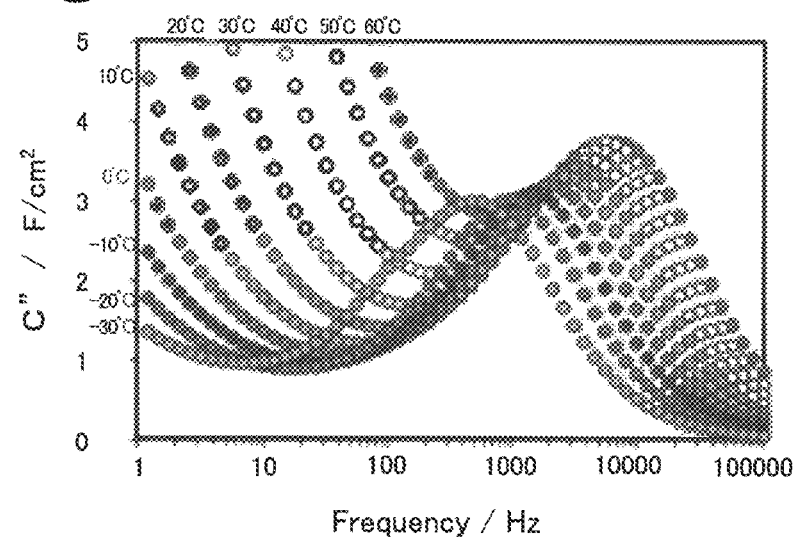
Figure 17A:
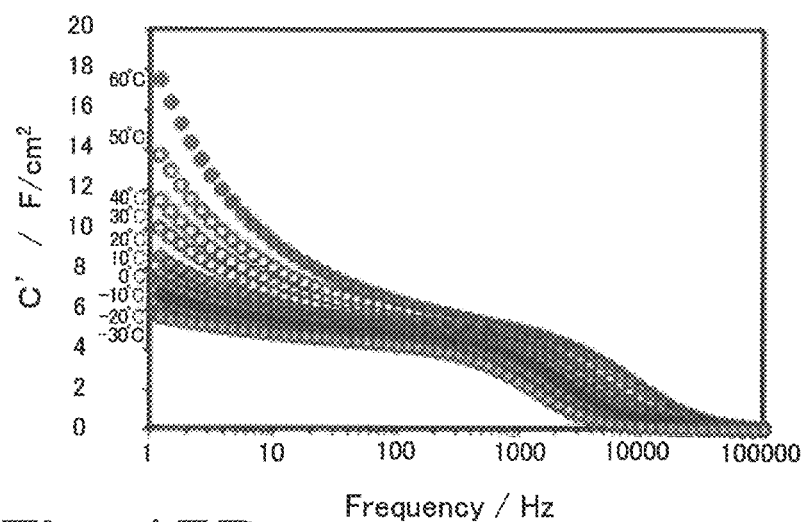
FIGS. 17A and 17B show graphs of a real component C' and an imaginary component C" versus frequency of Example 2.
Figure 17B:
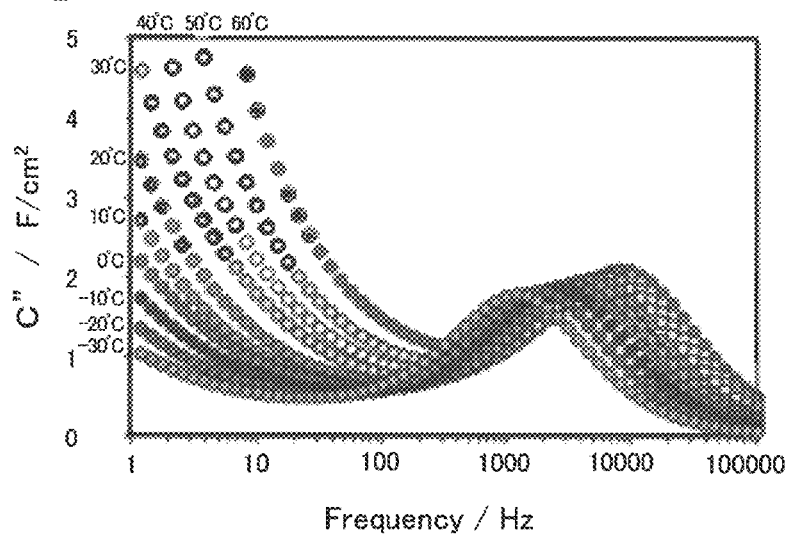
Figure 18A:
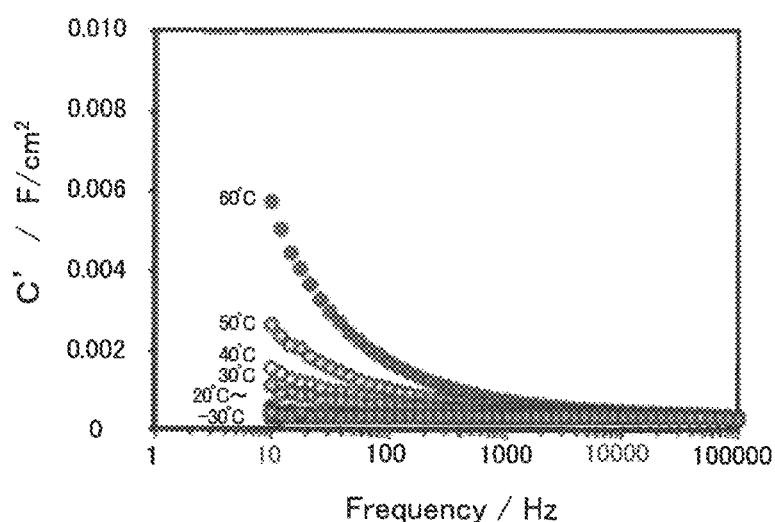
FIGS. 18A and 18B show graphs of a real component C' and an imaginary component C" versus frequency of Comparative Example 1.
Figure 18B:
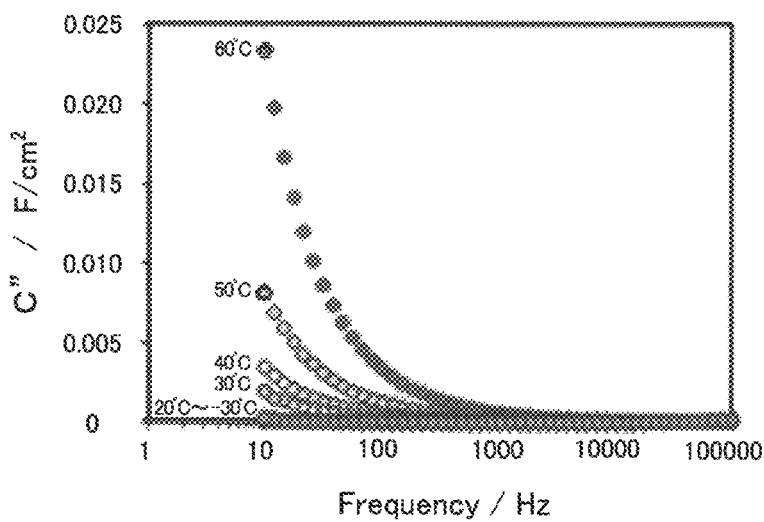
Figure 19A:
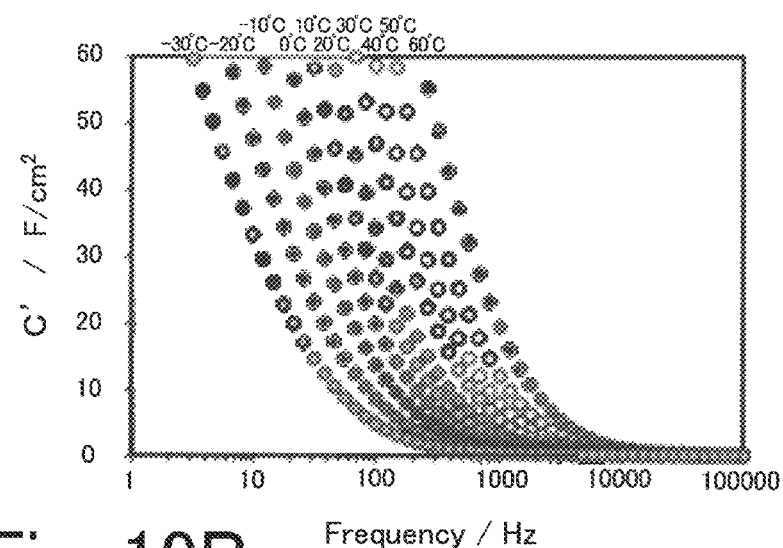
FIGS. 19A and 19B show graphs of a real component C' and an imaginary component C" versus frequency of Comparative Example 2.
Figure 19B:
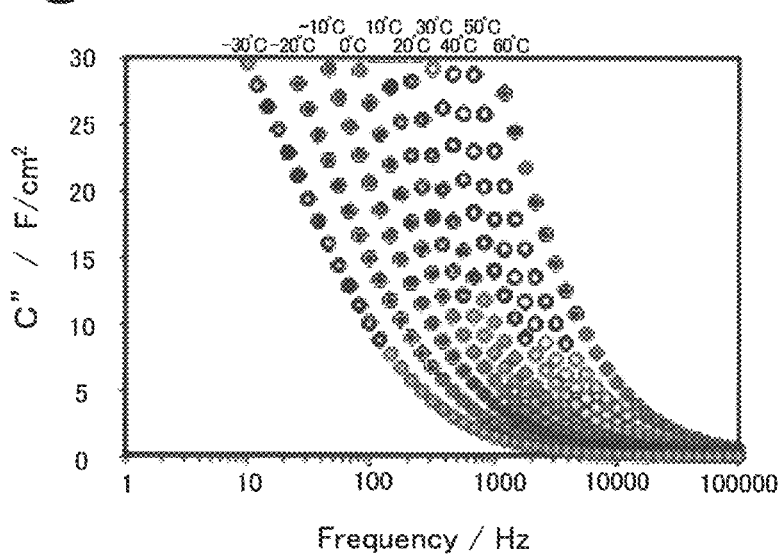
Figure 20A:
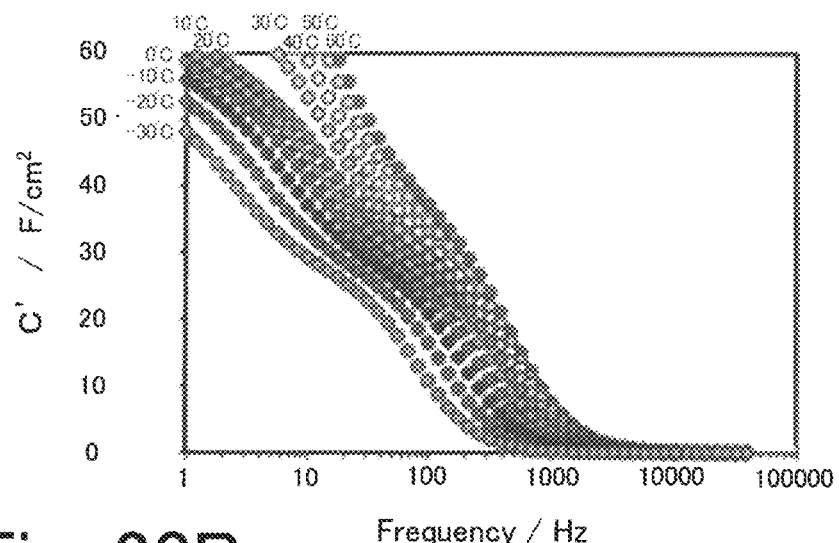
FIGS. 20A and 20B show graphs of a real component C' and an imaginary component C" versus frequency of Comparative Example 4.
Figure 20B:
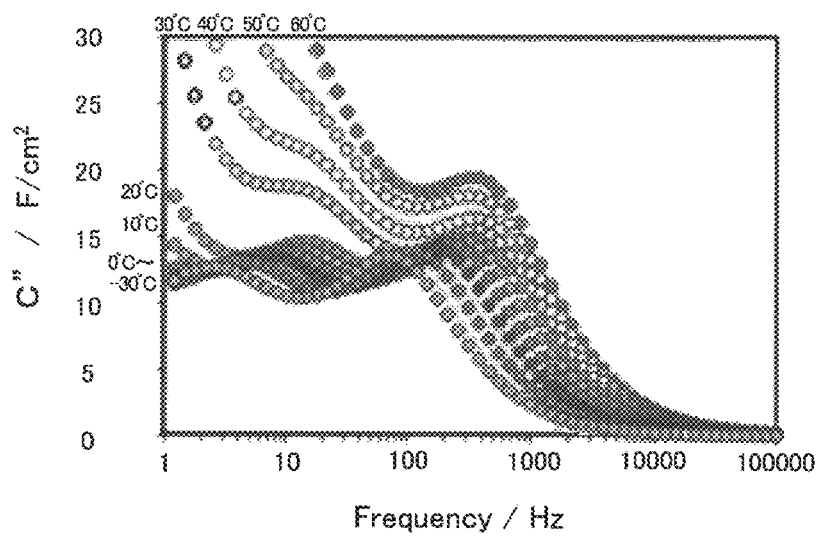

FIGS. 15A and 15B show models of a real component C' (FIG. 15A) and an imaginary component C" (FIG. 15B) versus frequency. In these models, as shown in FIG. 15A, the real component C' increases as the frequency decreases, and if not a monotonous increase but a flat region appears, the formation of an electric double layer is confirmed. As shown in FIG. 15B, the imaginary component C" increases as the frequency decreases and is maximized in a certain range. By determining the frequency (f=1/t) at the maximum value, responsivities of electric double layers can quantitatively be compared. FIGS. 16A and 16B show graphs of a real component C' (FIG. 16A) and an imaginary component C" (FIG. 16B) versus frequency of Example 1. FIGS. 17A and 17B show graphs of a real component C' (FIG. 17A) and an imaginary component C" (FIG. 17B) versus frequency of Example 2. FIGS. 18A and 18B show graphs of a real component C' (FIG. 18A) and an imaginary component C" (FIG. 18B) versus frequency of Comparative Example 1. FIGS. 19A and 19B show graphs of a real component C' (FIG. 19A) and an imaginary component C" (FIG. 19B) versus frequency of Comparative Example 2. FIGS. 20A and 20B show graphs of a real component C' (FIG. 20A) and an imaginary component C" (FIG. 20B) versus frequency of Comparative Example 4.

Figure 21:
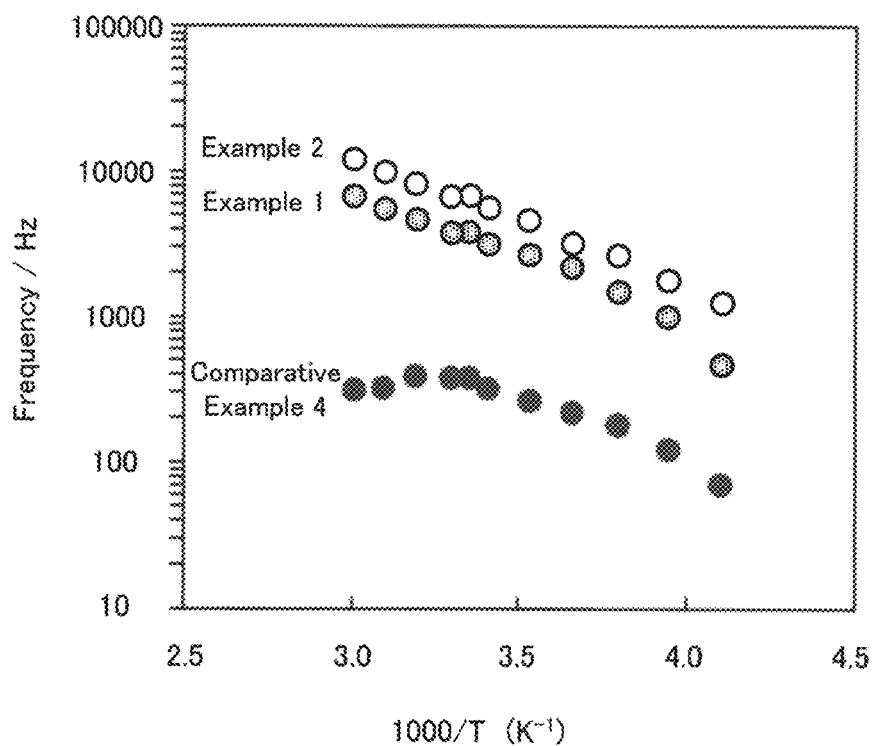
FIG. 21 shows a graph of frequency at maximum versus temperature of Examples 1 and 2 of Comparative Example 4.

As shown in FIGS. 16 and 17, in Examples 1 and 2, behavior indicating a constant capacitance component (flat region) was observed in the frequency dependence of the real component C', which demonstrates storage of electric double-layer capacitance. In addition, in Examples 1 and 2, the imaginary component C" was maximized in the frequency range of 1 kHz to 10 kHz, which shows high response performance of an electric double layer. By contrast, as shown in FIGS. 18 and 19, in Comparative Examples 1 and 2, the real component C' had frequency characteristics exhibiting no behavior indicating a capacitance component having a flat region, and the imaginary component C" had frequency characteristics having no maximum values. This suggests that there was no storage mechanism due to electric double-layer capacitance in Comparative Examples 1 and 2. As shown in FIGS. 20A and 20B, in Comparative Example 4, in which a common organic electrolytic solution was used, the real component C' had frequency characteristics having a slightly flat region, and the imaginary component C" had frequency characteristics having maximum values. This shows that an electric double layer was formed in Comparative Example 4. In Comparative Example 4, from the maximum values of the imaginary component C", the response performance of the electric double layer was confirmed in the frequency range of 0.1 to 1 kHz. However, frequency characteristics were lower in Comparative Example 4 than in Examples 1 and 2. FIG. 21 plots the frequencies at the maximum values obtained from the frequency characteristics of the imaginary components C" of Examples 1 and 2 and Comparative Example 4 against reciprocal temperature. As shown in FIG. 21, at any temperature, capacitance frequency characteristics were more excellent when the electrolytes of Examples 1 and 2 were used than when the non-aqueous electrolytic solution of Comparative Example 4 was used. These results revealed that the electrolytes of Examples 1 and 2 provide capacitors with high responsivity.

TABLE 2

| | Electrolyte | | Frequency characteristics of maximum values of imaginary component C" | | |
|---|---|---|---|---|---|
| | Layered structure[1] | Organic solvent | Maximum value (−30° C.) Hz | Maximum value (20° C.) Hz | Maximum value (60° C.) Hz |
| Example 1 | Naph | Dimethyl sulfoxide | 500 | 3000 | 7000 |
| Example 2 | Naph | Propylene carbonate | 1000 | 5000 | 8000 |
| Comparative example 4 | — | $LiPF_6$/ (EC + DMC + EMC) | 100 | 300 | 400 |

Figure 22:
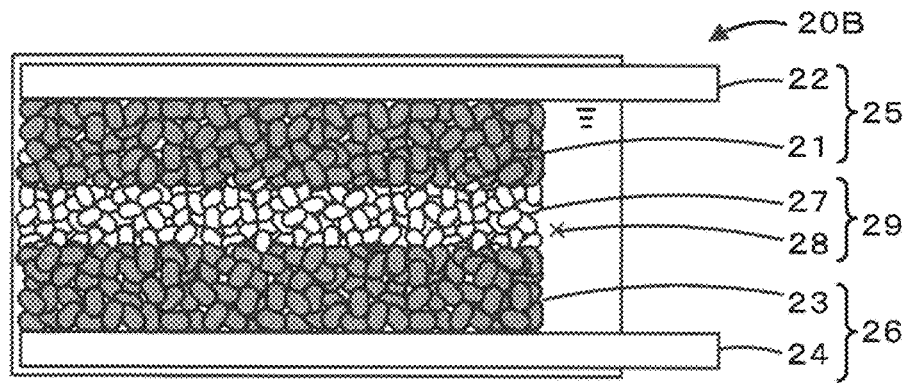
FIG. 22 is a schematic view of an exemplary electricity storage device 20B.

[1]Naph: Naphthalene dicarboxylate dilithium
2) EC: Ethylene carbonate, DMC: Dimethyl carbonate, EMC: Ethyl methyl carbonate FIG. 22 is a schematic view of an electricity storage device 20B (capacitor cell) including an electrolyte in which an aromatic dicarboxylic acid alkali metal salt and a high-dielectric organic solvent coexist. The electricity storage device 20B includes a positive electrode 25, a negative electrode 26, and an electrolyte 29. The positive electrode 25 includes a positive electrode mixture layer 21 containing activated carbon and a positive electrode current collector 22. The negative electrode 26 includes a negative electrode mixture layer 23 containing activated carbon or a Ti composite oxide and a negative electrode current collector 24. The electrolyte 29 includes an organic crystal layer 27 formed of an aromatic dicarboxylic acid alkali metal salt and an organic solvent 28 having a high dielectric constant. As shown in FIGS. 2 and 3, a layered structure of an aromatic dicarboxylic acid alkali metal salt undergoes a charge-discharge reaction at a metal Li potential of 0.5 V to 1.0 V and can be used as an electrode material (negative electrode active material). In this case, the layered structure is used as an electrode in the form of a complex (electrode structure) of a layered structure having no conductivity and additive conductive carbon. The present disclosure, however, is intended for use in a potential range (metal Li potentials of 1.0 V or more) where the layered structure undergoes no charge-discharge reactions. An electrode material that undergoes a charge-discharge reaction in this range is selected, and the layered structure is used as an electrolyte that conducts only ions between positive and negative electrodes. The electrolyte in which an aromatic dicarboxylic acid alkali metal salt and an organic solvent coexist functions to block the electron conduction between positive and negative electrodes and conduct only ions. As shown in FIG. 2, using activated carbon as an electrode material for both positive and negative electrodes enables a cell design that achieves a cell voltage of 2.5 V to 4.0 V. As shown in FIG. 3, using activated carbon and a Ti composite oxide as electrode materials enables a cell design that achieves a cell voltage of 2.7 V to 3.4 V. As described above, it turned out that the electrolyte has electric double-layer capacitance and high responsivity, and thus provides a capacitor cell that exhibits high charge-discharge performance.

The present application claims priority on the basis of the Japanese Patent Application No. 2018-71365 filed on Apr. 3, 2018, the entire contents of which are incorporated herein by reference.

What is claimed is:

1. An electricity storage device comprising:

a positive electrode containing a positive electrode active material;

a negative electrode containing a negative electrode active material; and an electrolyte layer that includes an organic crystal layer including a layered structure and an organic solvent in the organic crystal layer, the electrolyte layer being interposed between and in direct contact with each of the positive electrode and the negative electrode to conduct alkali metal ions, the layered structure including an organic backbone layer containing an aromatic dicarboxylic acid anion having an aromatic ring structure, wherein the aromatic dicarboxylic acid anion having an aromatic ring has at least one of a non-fused polycyclic structure in which two or more aromatic rings are linked together and a fused polycyclic structure in which two or more aromatic rings are fused together and an alkali metal element layer containing an alkali metal element that is coordinated with oxygen contained in a carboxylic acid of the organic backbone layer to form a framework, wherein at least one of the positive electrode and the negative electrode adsorbs and desorbs the ions to store and release electric charge, and wherein the layered structure has a structure represented by at least one of formulae (1) to (3):

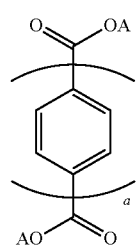

Formula (1)

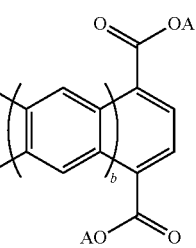

Formula (2)

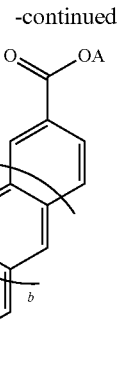

Formula (3)

wherein a represents an integer of 2 to 5, b represents an integer of 0 to 3, these aromatic compounds may have a substituent or a heteroatom in the molecular structure thereof, and A represents an alkali metal.

2. The electricity storage device according to claim 1, wherein at least one of the positive electrode active material and the negative electrode active material is a carbon material having a specific surface area of 100 $m^2/g$ or more.

3. The electricity storage device according to claim 1, wherein an imaginary component C" of a capacitance component at 20° C. of the electrolyte is maximized in a frequency band ranging from 1 kHz to 10 kHz.

4. The electricity storage device according to claim 1, wherein the organic solvent has a dielectric constant of 10 or more.

5. The electricity storage device according to claim 1, wherein the organic solvent is at least one of dimethyl sulfoxide, dimethylformamide, and propylene carbonate.

6. The electricity storage device according to claim 1, wherein the organic solvent contains no supporting electrolytes.

7. The electricity storage device according to claim 1, wherein the alkali metal element layer of the layered structure contains at least one of lithium, sodium, and potassium.

8. The electricity storage device according to claim 1, wherein the organic crystal layer is at least one of a self-supporting film and a self-supporting plate-like body.

9. The electricity storage device according to claim 1, wherein the organic crystal layer is packed with the layered structure at a volume ratio of 0.8 or more.

10. The electricity storage device according to claim 1, wherein the layered structure absorbs the alkali metal only into the alkali metal element layer.

11. The electricity storage device according to claim 1, wherein the negative electrode active material has an operating voltage higher than an operating voltage of the layered structure contained in the electrolyte.

12. The electricity storage device according to claim 1, comprising: a plurality of bipolar electrodes each including a current collector having, on one surface thereof, a positive electrode mixture layer containing the positive electrode active material and, on the other surface thereof, a negative electrode mixture layer containing the negative electrode active material, the current collector undergoing an alloying reaction with the alkali metal at a potential lower than an oxidation-reduction potential of the negative electrode active material; and the electrolyte interposed between the positive electrode mixture layer and the negative electrode mixture layer on an adjacent current collector, wherein the plurality of bipolar electrodes are stacked on top of each other with the electrolyte interposed therebetween.

13. The electricity storage device according to claim 12, wherein the current collector is made of a metal containing aluminum.

14. The electricity storage device according to claim 1, wherein the negative electrode includes a negative electrode active material that provides a negative electrode having a potential of more than 1.0 V versus a lithium reference.

15. The electricity storage device according to claim 1, wherein the electrolyte layer is comprised of an insulating substance.

* * * * *